US007997320B2

(12) United States Patent
Yamamoto et al.

(10) Patent No.: US 7,997,320 B2
(45) Date of Patent: Aug. 16, 2011

(54) SHEET CUTTER AND IMAGE FORMING APPARATUS INCLUDING THE SHEET CUTTER

(75) Inventors: Kohsuke Yamamoto, Numazu (JP); Kazuhisa Sudo, Kawasaki (JP); Reki Nakamura, Sagamihara (JP); Takehide Mizutani, Sagamihara (JP); Mikio Ishibashi, Yokohama (JP); Yukiko Iwasaki, Yokohama (JP); Nobuyuki Koinuma, Yokohama (JP); Takashi Sakamaki, Ebina (JP); Kazuhiko Yuki, Kawasaki (JP); Ryuji Yoshida, Yokohama (JP); Megumi Ohtoshi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 598 days.

(21) Appl. No.: 12/155,892

(22) Filed: Jun. 11, 2008

(65) Prior Publication Data

US 2009/0000445 A1 Jan. 1, 2009

(30) Foreign Application Priority Data

Jun. 26, 2007 (JP) ................................ 2007-168062
Sep. 14, 2007 (JP) ................................ 2007-239634

(51) Int. Cl.
*B29C 65/00* (2006.01)
*B32B 37/00* (2006.01)
*B32B 38/04* (2006.01)

(52) U.S. Cl. ......... 156/510; 156/250; 156/253; 156/522

(58) Field of Classification Search .................. 156/250, 156/253, 510, 522; 399/385–387; 101/224, 101/226; 83/78, 500
See application file for complete search history.

(56) References Cited

U.S. PATENT DOCUMENTS 4,646,162 A * 2/1987 Sue .............................. 358/498
4,721,058 A * 1/1988 Hayamizu et al. ............ 118/665
4,854,204 A * 8/1989 Faltin .............................. 83/500
5,229,827 A * 7/1993 Sato et al. ..................... 399/385
5,628,864 A * 5/1997 Kataigi et al. ............. 156/441.5
2007/0164505 A1 7/2007 Ishibashi et al.
2008/0019708 A1 1/2008 Sakamaki et al.

FOREIGN PATENT DOCUMENTS

JP 03-050586 3/1991
JP 08-053250 2/1996
JP 08-053259 2/1996
JP 10-177285 6/1998
JP 10-320329 12/1998
JP 10-320330 12/1998
JP 11-353262 12/1999
JP 2002-014899 1/2002
JP 2002-073482 3/2002
JP 2003-071785 3/2003
JP 2003-196210 7/2003

* cited by examiner

*Primary Examiner* — Mark A Osele
*Assistant Examiner* — Christopher C Caillouet
(74) *Attorney, Agent, or Firm* — Harness, Dickey & Pierce, P.L.C.

(57) ABSTRACT

A sheet cutter cuts an adhesion sheet and includes a pair of blades including a first blade including a blade edge and a second blade opposing the first blade and including a blade edge. The pair of blades cuts a border of the adhesion sheet. The adhesion sheet is formed by adhering a first sheet, at least a part of which is transparent and bears a mirror image, to a non-transparent second sheet including an adhesive layer, to oppose the mirror image on the first sheet against the adhesive layer of the second sheet.

19 Claims, 14 Drawing Sheets

| | TRANSPARENT SHEET | NON-TRANSPARENT SHEET |
|---|---|---|
| CLOSER TO EDGE | (4) ○ | (3) △ |
| CLOSER TO CENTER | (2) △ | (1) × |

SHEET CUTTER AND IMAGE FORMING APPARATUS INCLUDING THE SHEET CUTTER

PRIORITY STATEMENT

The present patent application claims priority from Japanese Patent Application Nos. 2007-168062, filed on Jun. 26, 2007 and 2007-239634, filed on Sep. 14, 2007 in the Japan Patent Office, the entire contents of each of which are hereby incorporated herein by reference.

BACKGROUND OF THE INVENTION

1. Field of the Invention

Example embodiments generally relate to a sheet cutter and an image forming apparatus including the sheet cutter, for example, for cutting a laminated sheet.

2. Description of the Related Art

A related-art image forming apparatus, such as a copier, a printer, a facsimile machine, or a multifunction printer having at least one of copying, printing, scanning, and facsimile functions, typically forms a high-quality glossy image on a sheet by electrophotography.

One example of such image forming apparatus includes a sheet adhering device for forming an adhesion sheet by adhering a transparent sheet bearing a mirror image formed by electrophotography to a white sheet, in such a manner that the transparent sheet and the white sheet sandwich the mirror image.

Usually, the transparent sheet is manually adhered to the white sheet by spraying an adhesive onto a surface of the transparent sheet bearing the mirror image. Therefore, when the transparent sheet and the white sheet have different sizes or when the transparent sheet and the white sheet are not precisely overlaid, edges of the transparent sheet and the white sheet may be misaligned.

Currently, there is market demand for an image forming apparatus capable of providing a borderless sheet bearing a photographic image. However, the related-art image forming apparatus using electrophotography forms a toner image in a particular area of a sheet that is defined by predetermined edge margins. Consequently, it may be difficult for such an apparatus to form a borderless photographic image.

To accommodate such demand, a sheet cutter may be connected to the image forming apparatus. FIGS. 1A and 1B illustrate a sheet cutter 40R as one example of such sheet cutter. The sheet cutter 40R includes a blade 38R for cutting an adhesion sheet 200. The adhesion sheet 200 is formed by adhering a first sheet 100 to a second sheet 91. The first sheet 100 is transparent and bears a mirror image 100A (e.g., a toner image). The second sheet 91 (e.g., a white sheet) is non-transparent and includes a base layer 91A and an adhesive layer 91B. The first sheet 100 and the second sheet 91 are attached to each other in such a manner that the mirror image 100A on the first sheet 100 opposes the adhesive layer 91B of the second sheet 91. A blade edge 38RA of the blade 38R contacts and cuts the adhesion sheet 200.

FIG. 1A illustrates the blade 38R and the adhesion sheet 200 immediately before the blade 38R cuts the adhesion sheet 200. FIG. 1B illustrates the blade 38R and the adhesion sheet 200 when the blade 38R cuts the adhesion sheet 200.

It is important to note that the first sheet 100 and the second sheet 91 sandwich layers having different material properties (e.g., hardnesses), specifically, the hard mirror image 100A and the soft adhesive layer 91B. Therefore, when the blade 38R cuts a border of the adhesion sheet 200, the soft adhesive layer 91B may be deformed, possibly causing toner particles to drop from the mirror image 100A or cracking the mirror image 100A. Moreover, the first sheet 100 may separate from the second sheet 91.

Obviously, such cracked mirror image 100A and separation of the first sheet 100 from the second sheet 91 are undesirable, and accordingly, there is a need for a technology to provide an adhesion sheet 200 bearing a high-quality glossy image and having clean-cut edges.

SUMMARY

At least one embodiment may provide a sheet cutter that cuts an adhesion sheet and includes a pair of blades including a first blade including a blade edge and a second blade opposing the first blade and including a blade edge. The pair of blades cuts a border of the adhesion sheet. The adhesion sheet is formed by adhering a first sheet, at least a part of which is transparent and bears a mirror image, to a non-transparent second sheet including an adhesive layer, to oppose the mirror image on the first sheet against the adhesive layer of the second sheet.

At least one embodiment may provide an image forming apparatus that includes an image forming device and a sheet cutter. The image forming device forms a mirror image on a transparent portion provided in at least a part of a first sheet. The sheet cutter cuts an adhesion sheet and includes a pair of blades including a first blade including a blade edge and a second blade opposing the first blade and including a blade edge. The pair of blades cuts a border of the adhesion sheet. The adhesion sheet is formed by adhering a first sheet, at least a part of which is transparent and bears a mirror image, to a non-transparent second sheet including an adhesive layer, to oppose the mirror image on the first sheet against the adhesive layer of the second sheet.

Additional features and advantages of example embodiments will be more fully apparent from the following detailed description, the accompanying drawings, and the associated claims.

BRIEF DESCRIPTION OF THE DRAWINGS

A more complete appreciation of example embodiments and the many attendant advantages thereof will be readily obtained as the same becomes better understood by reference to the following detailed description when considered in connection with the accompanying drawings, wherein.

Figure 1A:
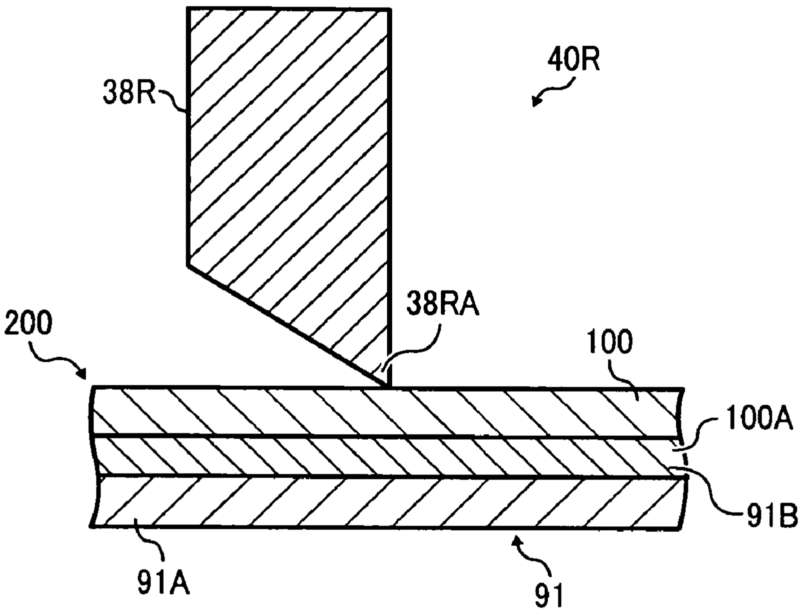
FIG. 1A RELATED ART
FIG. 1A is a sectional view of a related-art sheet cutter immediately before a cut operation.
Figure 1B:
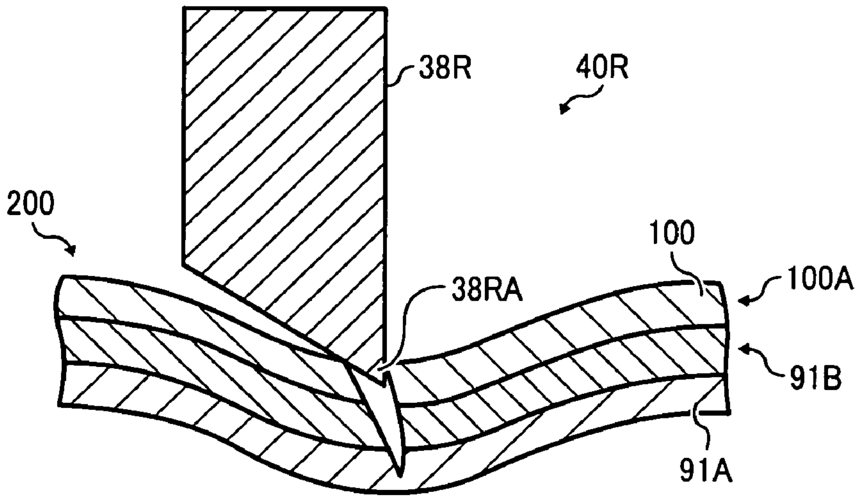
FIG. 1B RELATED ART
FIG. 1B is a sectional view of the related-art sheet cutter shown in FIG. 1A during the cut operation.

The accompanying drawings are intended to depict example embodiments and should not be interpreted to limit the scope thereof. The accompanying drawings are not to be considered as drawn to scale unless explicitly noted.

DETAILED DESCRIPTION OF EXAMPLE EMBODIMENTS

It will be understood that if an element or layer is referred to as being "on", "against", "connected to", or "coupled to" another element or layer, then it can be directly on, against, connected or coupled to the other element or layer, or intervening elements or layers may be present. In contrast, if an element is referred to as being "directly on", "directly connected to", or "directly coupled to" another element or layer, then there are no intervening elements or layers present. Like numbers refer to like elements throughout. As used herein, the term "and/or" includes any and all combinations of one or more of the associated listed items.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this specification is not intended to be limited to the specific terminology so selected and it is to be understood that each specific element includes all technical equivalents that operate in a similar manner.

Figure 2:
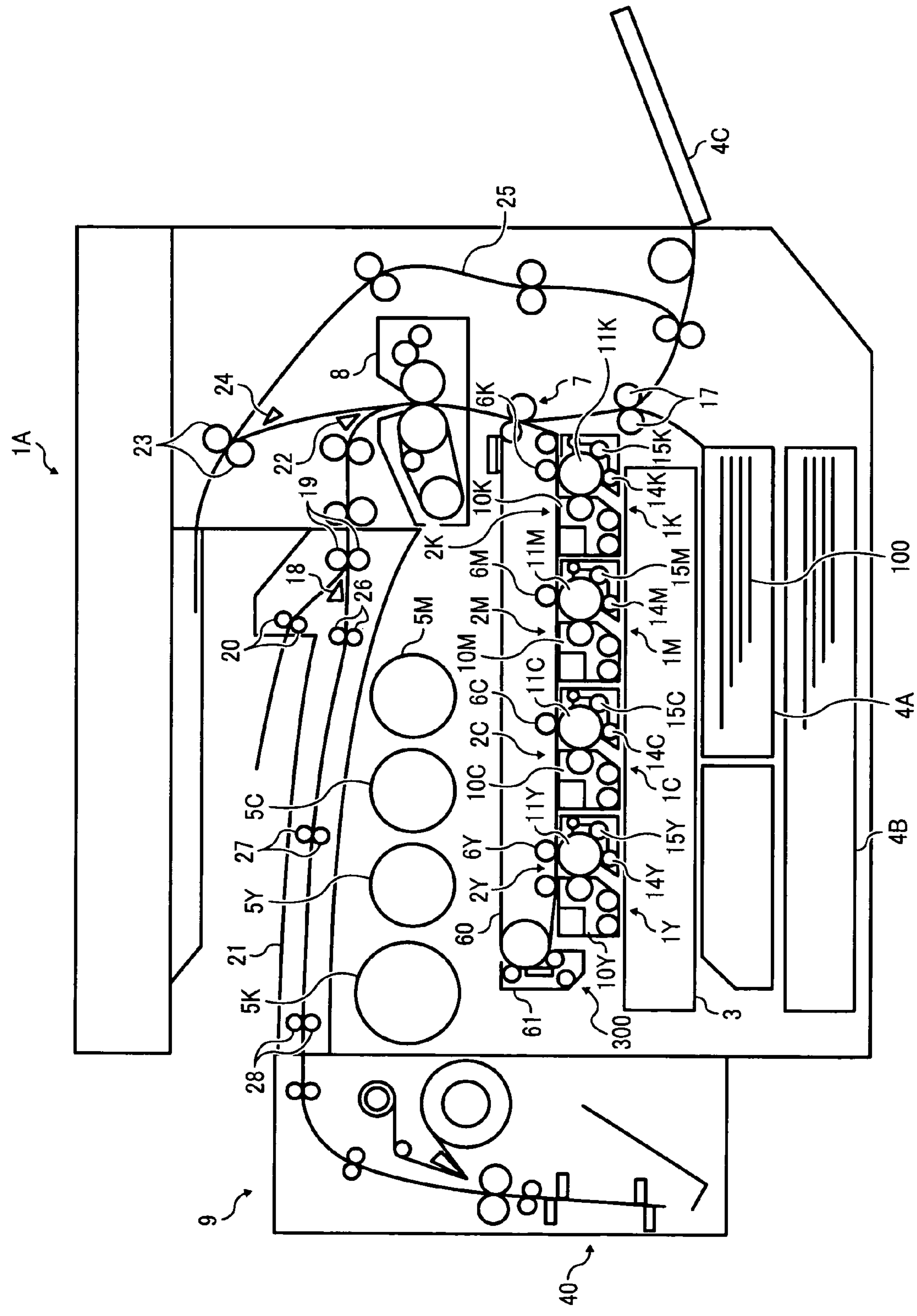
FIG. 2 is a sectional view of an image forming apparatus according to an example embodiment.

Referring now to the drawings, wherein like reference numerals designate identical or corresponding parts throughout the several views, particularly to FIG. 2, an image forming apparatus 1A according to an example embodiment is explained.

FIG. 2 is a schematic view of the image forming apparatus 1A. The image forming apparatus 1A includes an image forming device 300, an optical writing unit 3, toner containers 5Y, 5C, 5M, and 5K, paper trays 4A and 4B, a bypass tray 4C, a registration roller pair 17, a path selector 18, a convey roller pair 19, an output roller pair 20, an output tray 21, a path selector 22, a reverse roller pair 23, a path selector 24, a duplex conveyance path 25, convey roller pairs 26, 27, and 28, a sheet adhering device 9, and/or a sheet cutter 40. The image forming device 300 includes image forming units 1Y, 1C, 1M, and 1K, first transfer units 6Y, 6C, 6M, and 6K, a transfer-convey belt 60, a cleaner 61, a second transfer unit 7, and/or a fixing unit 8. The image forming units 1Y, 1C, 1M, and 1K include photoconductor units 2Y, 2C, 2M, and 2K, respectively. The photoconductor units 2Y, 2C, 2M, and 2K include photoconductors 11Y, 11C, 11M, and 11K, charging rollers 14Y, 14C, 14M, and 14K, development devices 10Y, 10C, 10M, and 10K, and/or cleaners 15Y, 15C, 15M, and 15K.

Figure 3:
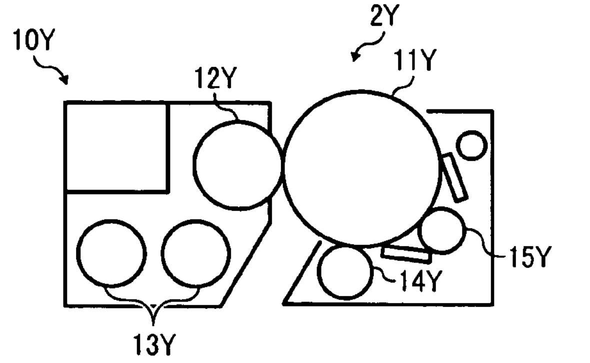
FIG. 3 is a sectional view (according to an example embodiment) of a photoconductor unit included in the image forming apparatus shown in FIG. 2.

FIG. 3 is a schematic view of the photoconductor unit 2Y. The development device 10Y includes a development roller 12Y and/or screws 13Y.

As illustrated in FIG. 2, the image forming apparatus 1A can be a copier, a facsimile machine, a printer, a plotter, a multifunction printer having at least one of copying, printing, scanning, plotter, and facsimile functions, or the like. According to this example embodiment, the image forming apparatus 1A functions as a color printer for forming a color image on a recording medium by electrophotography.

The image forming device 300 forms a toner image on a first sheet 100 such as a transparent sheet. The image forming units 1Y, 1C, 1M, and 1K form yellow, cyan, magenta, and black toner images, respectively. According to this example embodiment, the image forming units 1Y, 1C, 1M, and 1K are arranged in this order in a direction of rotation of the transfer-convey belt 60. However, the image forming units 1Y, 1C, 1M, and 1K may be arranged in other order. The image forming units 1Y, 1C, 1M, and 1K may be the photoconductor units 2Y, 2C, 2M, and 2K serving as process cartridges, respectively.

Referring to FIG. 3, the following describes the photoconductor unit 2Y. The photoconductor unit 2Y has a structure common to the photoconductor units 2C, 2M, and 2K (depicted in FIG. 2). In the photoconductor unit 2Y, the charging roller 14Y, the development device 10Y, and the cleaner 15Y are provided along an outer circumferential surface of the photoconductor 11Y. The photoconductor 11Y, the charging roller 14Y, the development device 10Y, and the cleaner 15Y are integrated into a cartridge (e.g., a process cartridge). Therefore, the photoconductor unit 2Y may be easily detached from the image forming apparatus 1A (depicted in FIG. 2) for repair or replacement. According to this example embodiment, the photoconductor 11Y, the charging roller 14Y, the development device 10Y, and the cleaner 15Y are integrated into a process cartridge. However, various integrations are possible. For example, the photoconductor 11Y and the charging roller 14Y may be integrated into a cartridge. Alternatively, the photoconductor 11Y and the development device 10Y may be integrated into a cartridge.

As illustrated in FIG. 2, the photoconductors 11Y, 11C, 11M, and 11K have a drum-like shape and serve as image carriers, respectively. The image forming units 1Y, 1C, 1M, and 1K are arranged in such a manner that rotation axes of the photoconductors 11Y, 11C, 11M, and 11K are parallel to each other and a reference pitch is provided between the photoconductors 11Y, 11C, 11M, and 11K adjacent to each other in the direction of rotation of the transfer-convey belt 60. The charging rollers 14Y, 14C, 14M, and 14K serve as chargers for uniformly charging the surfaces of the photoconductors 11Y, 11C, 11M, and 11K, respectively. The optical writing unit 3 is provided below the image forming units 1Y, 1C, 1M, and 1K, and includes a light source (not shown), a polygon mirror (not shown), an fθ lens (not shown), and an reflection mirror (not shown). The optical writing unit 3 emits and scans a laser beam onto the surfaces of the photoconductors 11Y, 11C, 11M, and 11K according to image data to form electrostatic latent images on the photoconductors 11Y, 11C, 11M, and 11K, respectively.

The toner containers 5Y, 5C, 5M, and 5K contain yellow, cyan, magenta, and black toner and supply the yellow, cyan, magenta, and black toner to the development devices 10Y, 10C, 10M, and 10K, respectively. The development devices 10Y, 10C, 10M, and 10K function as two-component development devices using a two-component developer containing toner particles and magnetic carriers. The development devices 10Y, 10C, 10M, and 10K use toner of colors different from each other, but have a common structure. As illustrated in FIG. 3, in the development device 10Y, the development roller 12Y opposes the photoconductor 11Y. The screws 13 convey and agitate the developer. The development device 10Y further includes a toner density sensor (not shown). The development roller 12Y includes a sleeve rotatably provided in an outer side thereof and a magnet provided in an inner side thereof. The magnet generates a magnetic force to attract toner particles and magnetic carriers to an outer surface of the rotating sleeve.

As illustrated in FIG. 2, the development devices 10Y, 10C, 10M, and 10K supply yellow, cyan, magenta, and black toner particles to the electrostatic latent images formed on the photoconductors 11Y, 11C, 11M, and 11K by using an electric field so as to form yellow, cyan, magenta, and black toner images, respectively. The toner containers 5Y, 5C, 5M, and 5K supply the yellow, cyan, magenta, and black toner to the development devices 10Y, 10C, 10M, and 10K according to values output by the toner density sensors, respectively.

The first transfer units 6Y, 6C, 6M, and 6K are provided above the image forming units 1Y, 1C, 1M, and 1K, and serve as a belt driver for driving the transfer-convey belt 60. The first transfer units 6Y, 6C, 6M, and 6K transfer and superimpose the yellow, cyan, magenta, and black toner images formed on the photoconductors 11Y, 11C, 11M, and 11K, respectively, onto the transfer-convey belt 60. The transfer-convey belt 60 conveys the superimposed toner images to the second transfer unit 7. After the yellow, cyan, magenta, and black toner images are transferred from the photoconductors 11Y, 11C, 11M, and 11K, respectively, onto the transfer-convey belt 60, the cleaners 15Y, 15C, 15M, and 15K remove residual toner particles from the surfaces of the photoconductors 11Y, 11C, 11M, and 11K, respectively.

The paper trays 4A and 4B are provided below the image forming device 300, and load first sheets 100. The bypass tray 4C is provided at one side of the image forming apparatus 1A, and loads first sheets 100. The registration roller pair 17 feeds a first sheet 100 fed from the paper tray 4A, the paper tray 4B, or the bypass tray 4C toward the second transfer unit 7.

The second transfer unit 7 is provided near the first transfer units 6Y, 6C, 6M, and 6Y (e.g., to the right of the first transfer unit 6K). The second transfer unit 7 transfers the superimposed toner images from the transfer-convey belt 60 onto the first sheet 100 fed by the registration roller pair 17 to form a color toner image on the first sheet 100. The cleaner 61 includes a brush roller (not shown) and a cleaning blade (not shown) and contacts an outer circumferential surface of the transfer-convey belt 60 to remove foreign substances, such as toner particles, from the outer circumferential surface of the transfer-convey belt 60. The toner particles removed by the cleaners 15Y, 15C, 15M, 15K, and 61 are sent to a waste toner bottle (not shown). The fixing unit 8 is provided above the second transfer unit 7. The fixing unit 8 fixes the color toner image on the first sheet 100 by using a belt fixing method.

Referring to FIG. 2, the following describes operations of the image forming apparatus 1A for forming a toner image on a first sheet 100. A power source (not shown) applies a reference voltage to the charging rollers 14Y, 14C, 14M, and 14K to uniformly charge the surfaces of the photoconductors 11Y, 11C, 11M, and 11K opposing the charging rollers 14Y, 14C, 14M, and 14K, respectively. The optical writing unit 3 scans laser beams on the charged surfaces of the photoconductors 11Y, 11C, 11M, and 11K according to image data so as to form electrostatic latent images on the surfaces of the photoconductors 11Y, 11C, 11M, and 11K, respectively. When the electrostatic latent images carried by the photoconductors 11Y, 11C, 11M, and 11K reach the development devices 10Y, 10C, 10M, and 10K by rotations of the photoconductors 11Y, 11C, 11M, and 11K, development rollers (not shown) opposing the photoconductors 11Y, 11C, 11M, and 11K supply yellow, cyan, magenta, and black toner to the electrostatic latent images formed on the surfaces of the photoconductors 11Y, 11C, 11M, and 11K so as to form yellow, cyan, magenta, and black toner images, respectively. The above-described operations are performed in the photoconductor units 2Y, 2C, 2M, and 2K at reference times, respectively. Thus, the yellow, cyan, magenta, and black toner images are formed on the surfaces of the photoconductors 11Y, 11C, 11M, and 11K, respectively. According to this example embodiment, the optical writing unit 3 forms the electrostatic latent images on the surfaces of the photoconductors 11Y, 11C, 11M, and 11K in a mirror mode in which the electrostatic latent images are formed as mirror images.

A first sheet 100 is fed from the paper tray 4A, the paper tray 4B, or the bypass tray 4C, and is temporarily stopped by the registration roller pair 17. The first transfer units 6Y, 6C, 6M, and 6K oppose the photoconductors 11Y, 11C, 11M, and 11K via the transfer-convey belt 60, respectively. A power source (not shown) applies a voltage, which has a polarity opposite to a polarity of toner particles forming the yellow, cyan, magenta, and black toner images on the photoconductors 11Y, 11C, 11M, and 11K, to the first transfer units 6Y, 6C, 6M, and 6K, respectively. Accordingly, the first transfer units 6Y, 6C, 6M, and 6K transfer the yellow, cyan, magenta, and black toner images from the photoconductors 11Y, 11C, 11M, and 11K onto the rotating transfer-convey belt 60 sequentially at image forming times of the photoconductor units 2Y, 2C, 2M, and 2K, respectively. Thus, the yellow, cyan, magenta, and black toner images are superimposed on the transfer-convey belt 60. The second transfer unit 7 transfers the superimposed toner images onto the first sheet 100 fed by the registration roller pair 17 to form a color toner image on the first sheet 100. The first sheet 100 bearing the color toner image is sent to the fixing unit 8. The fixing unit 8 applies heat and pressure to the first sheet 100 bearing the color toner image to fix the color toner image on the first sheet 100.

According to this example embodiment, the image forming apparatus 1A may print an image on a recording sheet (e.g., paper) instead of a transparent sheet in a normal mode in which the optical writing unit 3 forms normal images on the photoconductors 11Y, 11C, 11M, and 11K. When the normal mode is selected, the path selector 18 is activated, and the convey roller pair 19 feeds a recording sheet bearing a fixed toner image sent from the fixing unit 8 toward the output roller pair 20. The output roller pair 20 feeds the recording sheet onto the output tray 21.

The image forming apparatus 1A has a duplex print function. To form a toner image on a back side of a recording sheet bearing a toner image on its front side, for example, the path selector 22 opens a path for leading the recording sheet sent from the fixing unit 8 toward the reverse roller pair 23. The reverse roller pair 23 temporarily stops the recording sheet, and feeds back the recording sheet toward the path selector 24. The path selector 24 opens a path for leading the recording sheet toward the duplex conveyance path 25. The recording sheet is conveyed on the duplex conveyance path 25 toward the registration roller pair 17. The registration roller pair 17 feeds the recording sheet toward the second transfer unit 7 in such a manner that the back side of the recording sheet faces the transfer-convey belt 60. The second transfer unit 7 transfers a toner image from the transfer-convey belt 60 onto the back side of the recording sheet. The fixing unit 8 fixes the toner image on the back side of the recording sheet and feeds the recording sheet toward the convey roller pair 19. The convey roller pair 19 feeds the recording sheet bearing the toner images on its front and back sides, respectively, toward the output tray 21.

The convey roller pairs 26, 27, and 28 feed a first sheet 100 bearing a mirror image toward the sheet adhering device 9.

Figure 4:
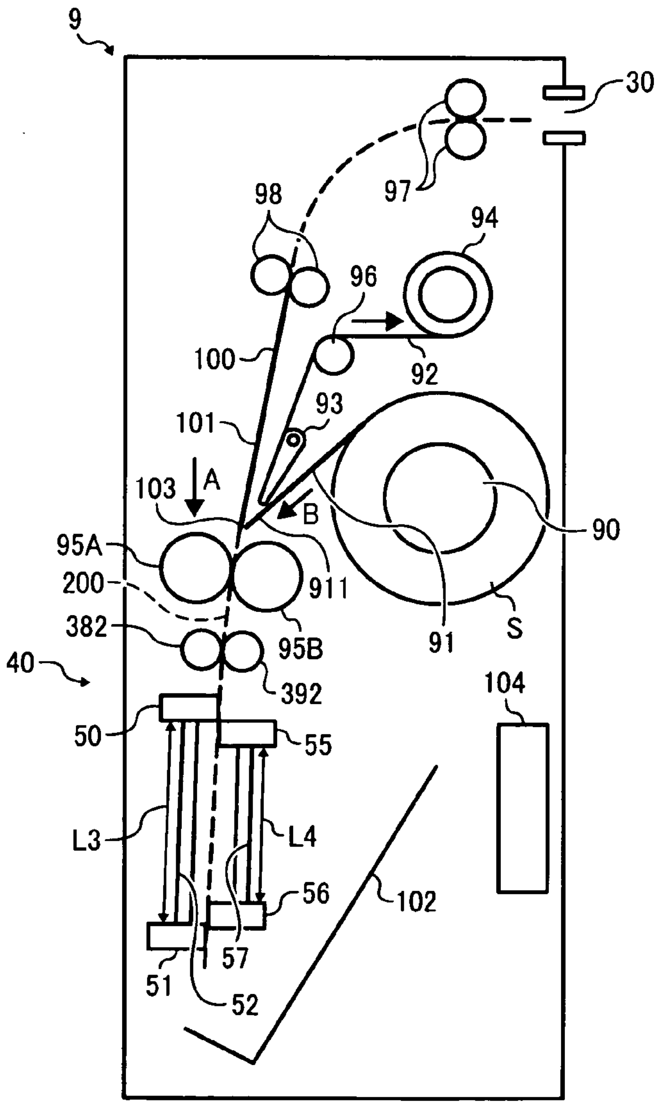
FIG. 4 is a sectional view (according to an example embodiment) of a sheet adhering device and a sheet cutter included in the image forming apparatus shown in FIG. 2.
Figure 5:
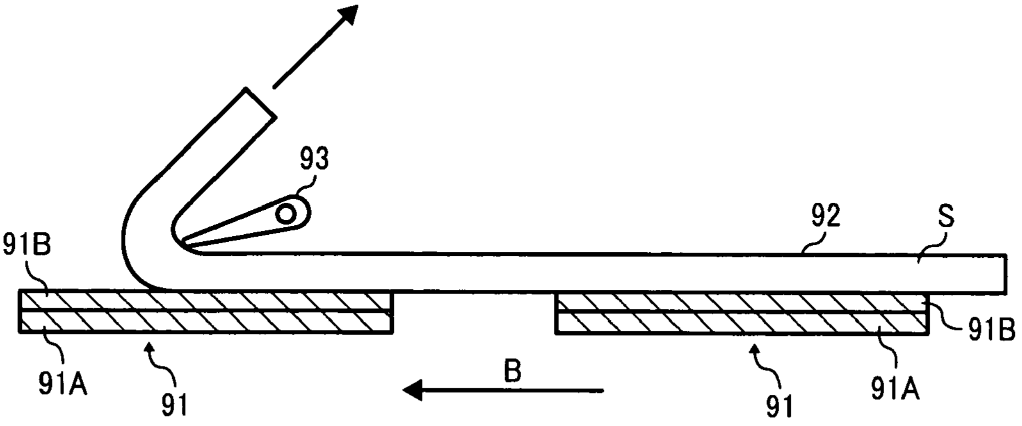
FIG. 5 is a sectional view (according to an example embodiment) of a sheet including a second sheet conveyed in the sheet adhering device shown in FIG. 4.

Referring to FIGS. 4 and 5, the following describes the sheet adhering device 9. FIG. 4 is a sectional view of the sheet adhering device 9 and the sheet cutter 40. The sheet adhering device 9 includes a sheet S, a shaft 90, a separation plate 93, a roller 96, a reel shaft 94, an entrance 30, convey roller pairs 97 and 98, and/or pressing rollers 95A and 95B. The sheet cutter 40 includes a second rotary blade 382, a fourth rotary blade 392, a fifth rotary blade 50, a sixth rotary blade 51, a seventh rotary blade 55, an eighth rotary blade 56, shafts 52 and 57, a controller 104, and/or a tray 102. The sheet S includes a second sheet 91 and/or a peel sheet 92.

FIG. 5 is a sectional view of the sheet S. The second sheet 91 includes a base layer 91A and/or an adhesive layer 91B.

As illustrated in FIG. 5, the base layer 91A is formed of white paper. The transparent adhesive layer 91B is layered on the base layer 91A to form the non-transparent second sheet 91 having reference length and width. The second sheets 91 are placed on the peel sheet 92 in such a manner that the adhesive layers 91B of the second sheets 91 face the peel sheet 92 and a reference distance is provided between a second sheet 91 and a subsequent second sheet 91, so as to form a sheet S. In other words, the adhesive layers 91B of the second sheets 91 having a length shorter than a length of the peel sheet 92 are adhered to the peel sheet 92 in such a manner that a reference distance is provided between a second sheet 91 and a subsequent second sheet 91, so as to form a sheet S.

As illustrated in FIG. 4, the shaft 90 supports a roll formed of a peel sheet 92 and a plurality of second sheets 91. The plurality of second sheets 91 has a reference width, and is placed and adhered to the peel sheet 92 in such a manner that a reference distance is provided between a second sheet 91 and a subsequent second sheet 91. When a sheet S is unreeled from the roll supported by the shaft 90, the separation plate 93 separates a second sheet 91 from a peel sheet 92 using curvature. The reel shaft 94 reels the peel sheet 92 separated from the second sheet 91 and fed by the roller 96. When the reel shaft 94 reels the peel sheet 92, a leading edge 911 of the second sheet 91 moves in a direction B oblique to a direction A in which a first sheet 100 is conveyed.

A first sheet 100 bearing a mirror image and sent from the image forming apparatus 1A (depicted in FIG. 2) is conveyed to the convey roller pair 97 via the entrance 30. The convey roller pair 97 feeds the first sheet 100 toward the convey roller pair 98. The convey roller pair 98 feeds the first sheet 100, toward the pressing rollers 95A and 95B. Before reaching the pressing rollers 95A and 95B, the first sheet 100 obliquely contacts the second sheet 91 conveyed in the direction B. For example, a leading edge 101 of the first sheet 100 obliquely contacts the leading edge 911 of the second sheet 91 at an oblique contact position 103. The adhesive layer 91B (depicted in FIG. 5) of the second sheet 91 causes the leading edge 911 of the second sheet 91 to adhere to the leading edge 101 of the first sheet 100. When the first sheet 100 and the second sheet 91 adhered to each other enter a nip formed between the pressing rollers 95A and 95B, the pressing rollers 95A and 95B apply pressure to the first sheet 100 and the second sheet 91 to adhere the first sheet 100 and the second sheet 91 to each other firmly into a single adhesion sheet (e.g., an adhesion sheet 200). The pressing rollers 95A and 95B feed the adhesion sheet 200 downward toward the second rotary blade 382 and the fourth rotary blade 392 of the sheet cutter 40.

Figure 6:
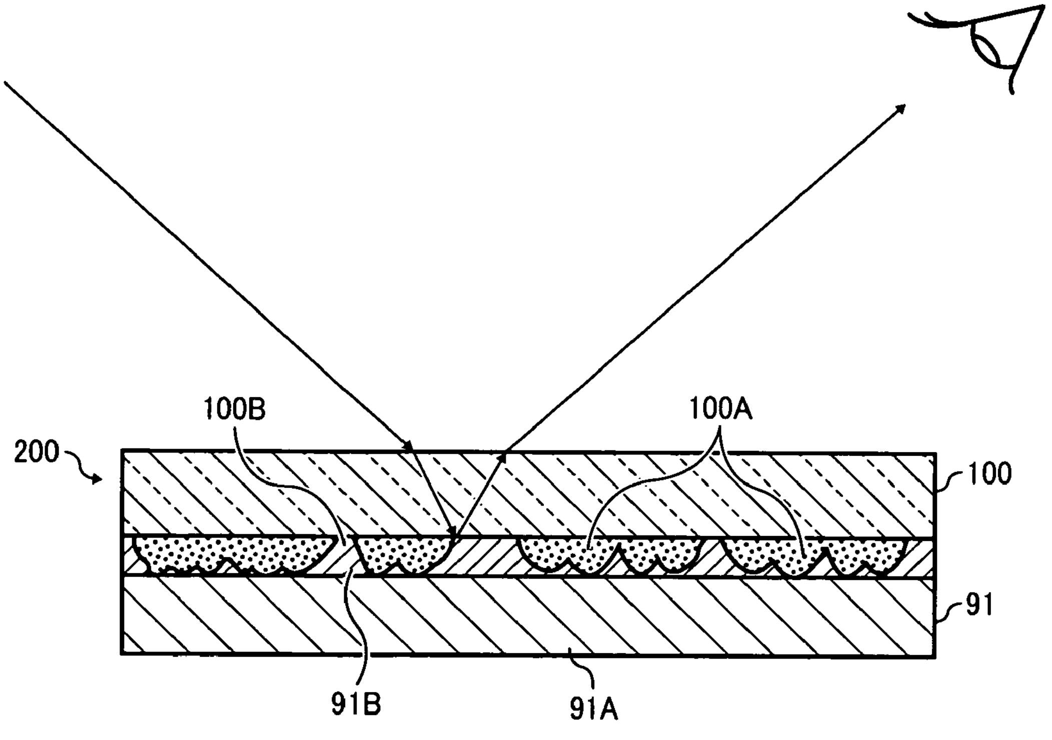
FIG. 6 is a sectional view (according to an example embodiment) of an adhesion sheet formed by the sheet adhering device shown in FIG. 4.

FIG. 6 is a sectional view of the adhesion sheet 200 formed by the first sheet 100 and the second sheet 91 adhered to each other. The sheet adhering device 9 (depicted in FIG. 4) adheres the first sheet 100 to the second sheet 91 to form the adhesion sheet 200 bearing a glossy photographic image. For example, a mirror image 100A is formed on a surface of the first sheet 100. The second sheet 91, that is, a non-transparent sheet such as white paper, includes the adhesive layer 91B. The mirror image 10A on the first sheet 100 and the adhesive layer 91B of the second sheet 91 face and adhere to each other.

When the first sheet 100 and the second sheet 91 are adhered to each other in such a manner that the first sheet 100 and the second sheet 91 sandwich the mirror image 10A, a glossy normal image may be seen on a background (e.g., the white base layer 91A of the second sheet 91) from an eyepoint above the first sheet 100. A surface of a transparent sheet (e.g., the first sheet 100) flattens a toner image (e.g., the mirror image 10A). The glossy first sheet 100 causes the mirror image 100A as well as a non-image area 100B, in which no toner image is formed, to provide uniform gloss. Thus, the adhesion sheet 200 may bear a photographic image.

Figure 7:
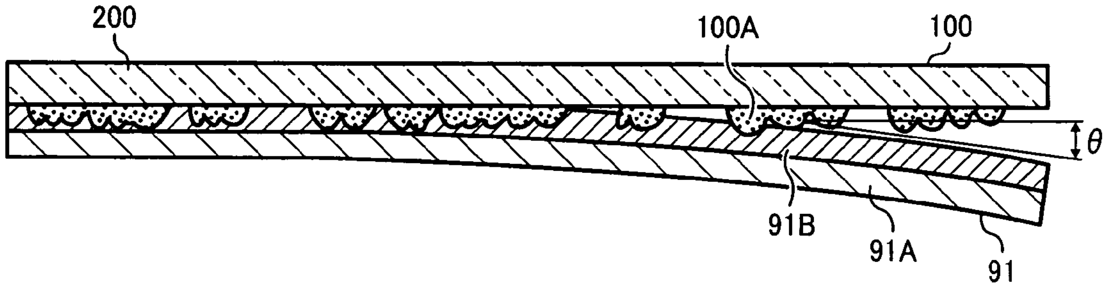
FIG. 7 is a sectional view (according to an example embodiment) of an adhesion sheet processed by the sheet adhering device shown in FIG. 4.

However, when the first sheet 100 and the second sheet 91 are adhered to each other, a bubble may generate between the mirror image 100A and the adhesive layer 91B, degrading quality of the mirror image 100A. To prevent the degradation, the separation plate 93 (depicted in FIG. 4) may rotate to adjust an angle θ formed by the first sheet 100 and the second sheet 91 at the oblique contact position 103 (depicted in FIG. 4) in a range of from about 30 degrees to about 90 degrees, as illustrated in FIG. 7.

Figure 8:
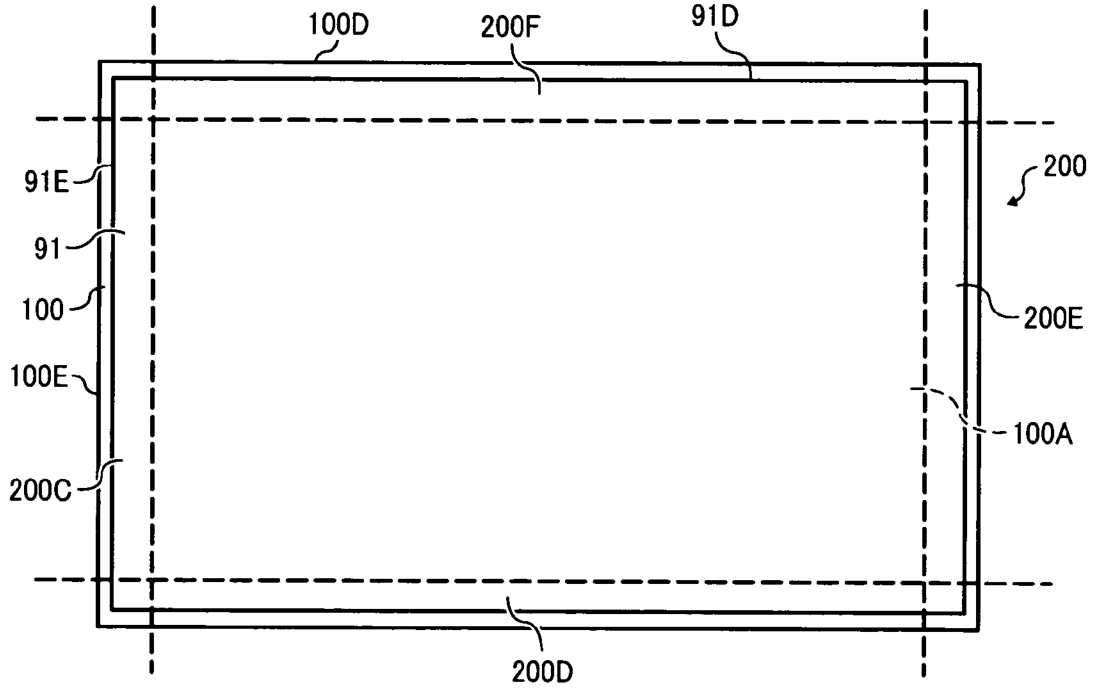
FIG. 8 is a plane view (according to an example embodiment) of the adhesion sheet shown in FIG. 6.

FIG. 8 is a plane view of the adhesion sheet 200. When the first sheet 100 and the second sheet 91 are adhered to each other, a leading edge 100D of the first sheet 100 may be shifted from a leading edge 91D of the second sheet 91 and/or a side edge 100E of the first sheet 100 may be shifted from a side edge 91E of the second sheet 91. Namely, the leading edge 100D may not be aligned with the leading edge 91D and the side edge 100E may not be aligned with the side edge 91E. Further, when a toner image (e.g., a mirror image 100A) is formed in an image forming apparatus using electrophotography (e.g., the image forming apparatus 1A depicted in FIG. 2), a frame is formed on borders of a sheet (e.g., an adhesion sheet 200). As a result, a borderless photographic image may not be formed on the sheet.

To address this problem, the sheet adhering device 9 is connected to the sheet cutter 40 (depicted in FIG. 4) for cutting a left border 200C, a bottom border 200D, a right border 200E, and a top border 200F of the adhesion sheet 200 bearing a toner image (e.g., the mirror image 100A) formed by electrophotography, so as to form a borderless photographic image properly. Alternatively, the sheet cutter 40 may cut the left border 200C, the bottom border 200D, the right border 200E, and the top border 200F of the adhesion sheet 200, so as not to form a borderless photographic image but to align the leading edge 100D with the leading edge 91D and to align the side edge 100E with the side edge 91E. However, the sheet cutter 40 may be effectively used to form a borderless photographic image, because cutting the left border 200C, the bottom border 200D, the right border 200E, and the top border 200F of the adhesion sheet 200 may prevent dropping of toner particles and formation of a cracked toner image in the left border 200C, the bottom border 200D, the right border 200E, and the top border 200F.

Figure 9:
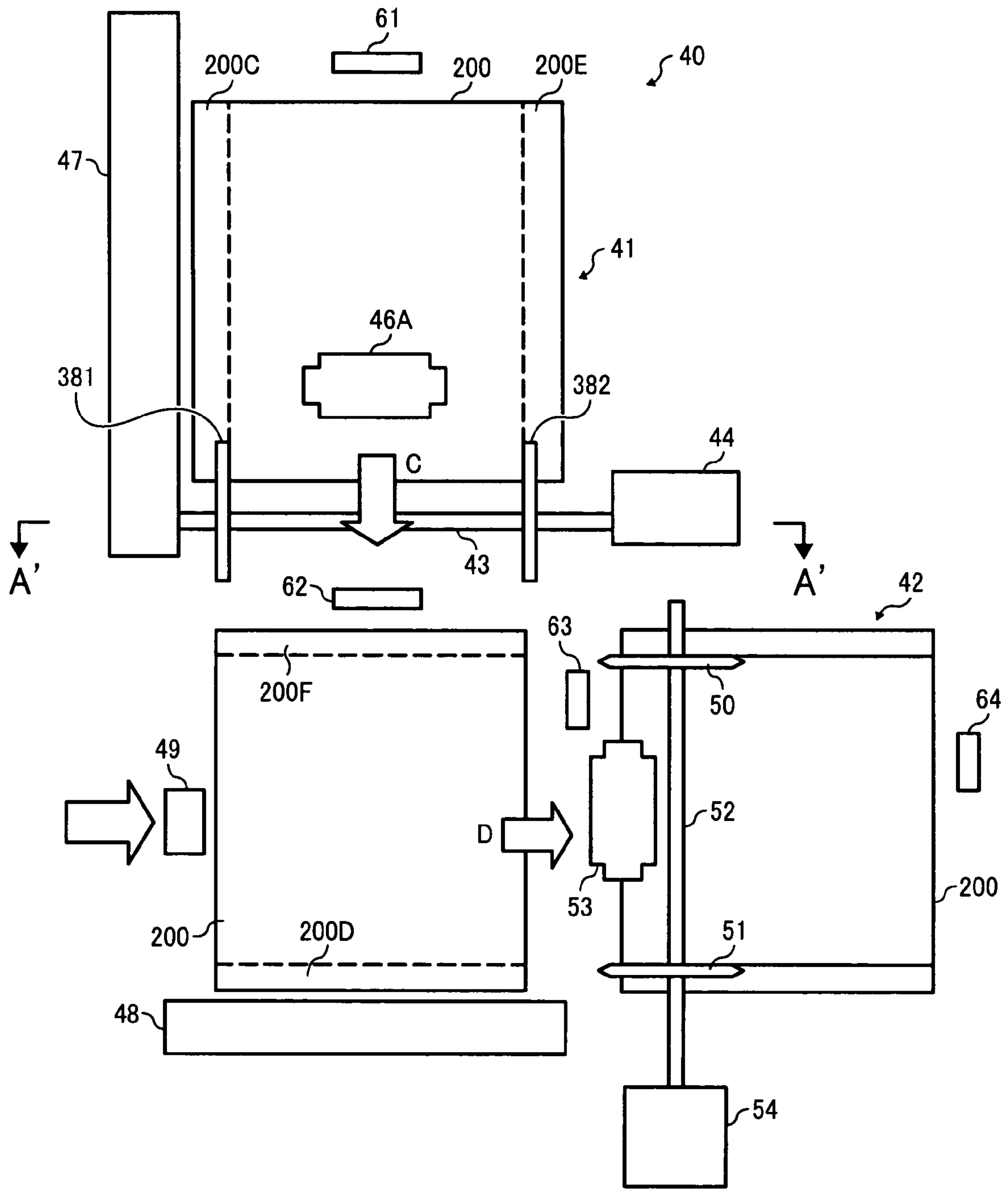
FIG. 9 is a plane view (according to an example embodiment) of the sheet cutter shown in FIG. 4.

FIG. 9 is a plane view of the sheet cutter 40. The sheet cutter 40 further includes a first cutter 41, a second cutter 42, guides 47 and 48, and/or a pusher 49. The first cutter 41 includes a first rotary blade 381, the second rotary blade 382, a shaft 43, a driver 44, a convey roller 46A, and/or sensors 61 and 62. The second cutter 42 includes the fifth rotary blade 50, the sixth rotary blade 51, the shaft 52, a convey roller pair 53, a driver 54, and/or sensors 63 and 64.

Figure 10:
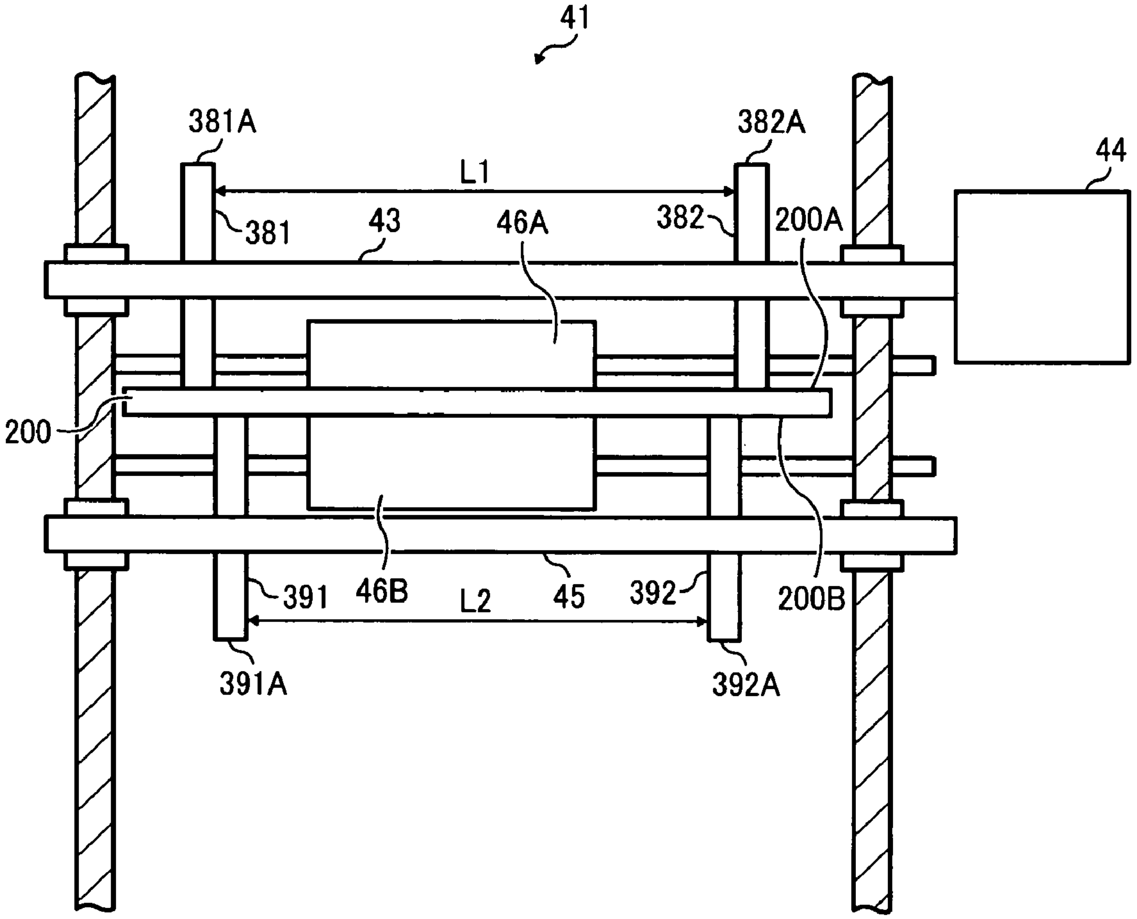
FIG. 10 is a sectional view (according to an example embodiment) of the sheet cutter taken on line A'-A' in FIG. 9.

FIG. 10 is a sectional view of the first cutter 41 taken on line A'-A' in FIG. 9. The first cutter 41 further includes a third rotary blade 391, the fourth rotary blade 392, a shaft 45, and/or a convey roller 46B. The first rotary blade 381 includes a blade edge 381A. The second rotary blade 382 includes a blade edge 382A. The third rotary blade 391 includes a blade edge 391A. The fourth rotary blade 392 includes a blade edge 392A.

As illustrated in FIG. 9, the first cutter 41 cuts the left border 200C and the right border 200E of the adhesion sheet 200 formed by adhering the first sheet 100 to the second sheet 91 (depicted in FIG. 6). The left border 200C and the right border 200E are provided in side ends of the adhesion sheet 200, respectively. The second cutter 42 cuts the top border 200F and the bottom border 200D of the adhesion sheet 200 provided in top and bottom of the adhesion sheet 200.

In the first cutter 41, the first rotary blade 381, serving as a first blade, cuts the left border 200C of the adhesion sheet 200 and the second rotary blade 382, serving as a first blade, cuts the right border 200E of the adhesion sheet 200. The shaft 43 connects the first rotary blade 381 to the second rotary blade 382. The first rotary blade 381 and the second rotary blade 382 are attached to the shaft 43 in such a manner that rotation of the shaft 43 rotates the first rotary blade 381 and the second rotary blade 382. The driver 44 (e.g., a motor) drives the shaft 43. When the driver 44 rotates the shaft 43, the blade edge 381A (depicted in FIG. 10) provided on an outer circumferential edge of the first rotary blade 381 cuts the left border 200C of the adhesion sheet 200, and the blade edge 382A (depicted in FIG. 10) provided on an outer circumferential edge of the second rotary blade 382 cuts the right border 200E of the adhesion sheet 200.

As illustrated in FIG. 10, the third rotary blade 391 and the fourth rotary blade 392, serving as second blades, oppose the first rotary blade 381 and the second rotary blade 382 via the adhesion sheet 200, respectively. The shaft 45 connects the third rotary blade 391 to the fourth rotary blade 392. The third rotary blade 391 and the fourth rotary blade 392 are attached to the shaft 45 in such a manner that rotation of the shaft 45 rotates the third rotary blade 391 and the fourth rotary blade 392. The driver 44 rotates the shaft 45 in such a manner that the shafts 43 and 45 rotate at a common speed by adjustment of gears. For example, the blade edge 381A of the first rotary blade 381 rotates together with the blade edge 391A provided on an outer circumferential edge of the third rotary blade 391 to cut the left border 200C (depicted in FIG. 9) of the adhesion sheet 200 on front and back surfaces of the adhesion sheet 200 (e.g., upper and lower surfaces of the adhesion sheet 200 in FIG. 10), respectively. The blade edge 382A of the second rotary blade 382 rotates together with the blade edge 392A provided on an outer circumferential edge of the fourth rotary blade 392 to cut the right border 200E (depicted in FIG. 9) of the adhesion sheet 200 on the front and back surfaces of the adhesion sheet 200 (e.g., the upper and lower surfaces of the adhesion sheet 200 in FIG. 10), respectively.

The convey rollers 46A and 46B (e.g., rubber rollers), serving as a conveyance member, form a roller pair for nipping the adhesion sheet 200. When the convey rollers 46A and 46B rotate to convey the adhesion sheet 200 in a direction C (depicted in FIG. 9), the first rotary blade 381 and the third rotary blade 391 rotate on the adhesion sheet 200 from a leading edge to a trailing edge of the adhesion sheet 200 to cut the left border 200C (depicted in FIG. 9), and the second rotary blade 382 and the fourth rotary blade 392 rotate on the adhesion sheet 200 from the leading edge to the trailing edge of the adhesion sheet 200 to cut the right border 200E (depicted in FIG. 9).

As illustrated in FIG. 9, the guide 47 is provided in the left of the adhesion sheet 200 to guide the adhesion sheet 200 in the direction C. The adhesion sheet 200 is conveyed in a state that a side edge of the adhesion sheet 200 facing the guide 47 is pressed against the guide 47. Thus, the first rotary blade 381 and the third rotary blade 391 (depicted in FIG. 10) may cut the adhesion sheet 200 along a proper line on the adhesion sheet 200. Similarly, the second rotary blade 382 and the fourth rotary blade 392 (depicted in FIG. 10) may cut the adhesion sheet 200 along a proper line on the adhesion sheet 200.

Figure 11A:
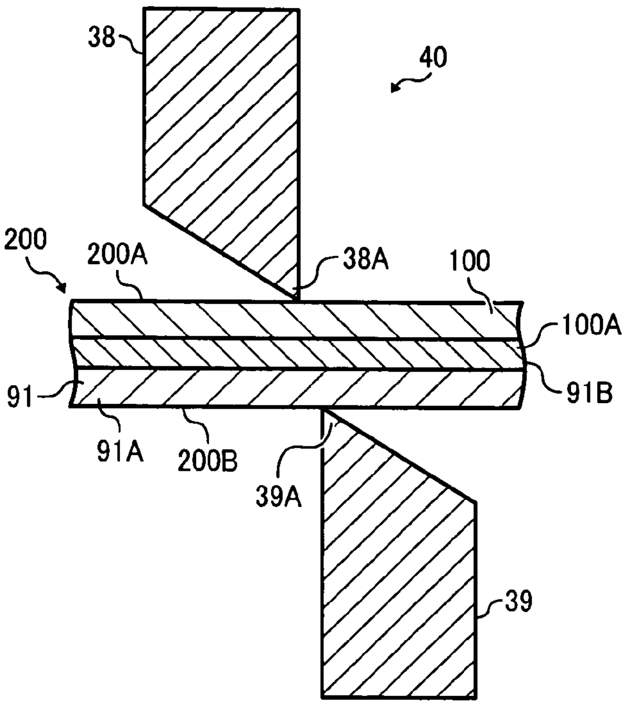
FIG. 11A is a partial sectional view (according to an example embodiment) of the sheet cutter shown in FIG. 9 immediately before a cut operation.
Figure 11B:
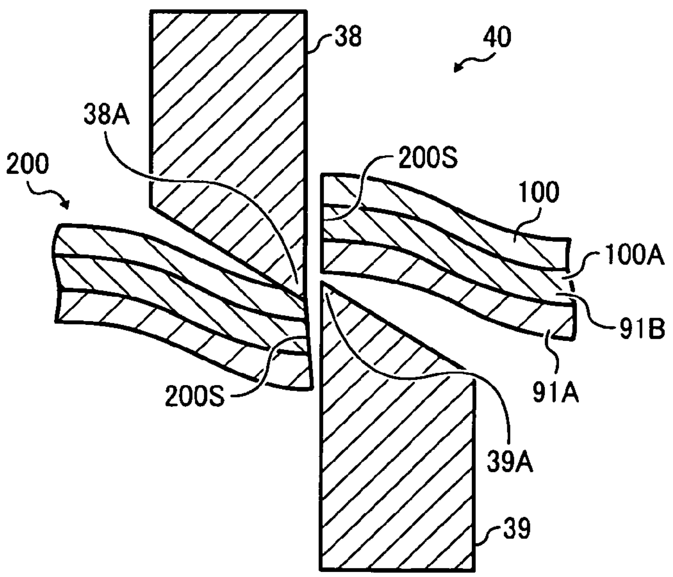
FIG. 11B is a partial sectional view (according to an example embodiment) of the sheet cutter shown in FIG. 11A during the cut operation.

Referring to FIGS. 11A and 11B, the following describes a first blade 38 and a second blade 39 for cutting an adhesion sheet 200. FIG. 11A is a sectional view of the first blade 38 and the second blade 39 immediately before cutting the adhesion sheet 200. FIG. 11B is a sectional view of the first blade 38 and the second blade 39 when cutting the adhesion sheet 200. As illustrated in FIGS. 11A and 11B, the first blade 38 includes a blade edge 38A. The second blade 39 includes a blade edge 39A.

The first blade 38 is equivalent to the first rotary blade 381, the second rotary blade 382, the fifth rotary blade 50, and the sixth rotary blade 51 depicted in FIG. 9. The second blade 39 is equivalent to the third rotary blade 391 and the fourth rotary blade 392 depicted in FIG. 10 and the seventh rotary blade 55 and the eighth rotary blade 56 depicted in FIG. 4.

As illustrated in FIG. 11A, the first blade 38 and the second blade 39 oppose each other via an upper surface 200A and a lower surface 200B of the adhesion sheet 200 to form a pair of blades. The blade edge 38A of the first blade 38 cuts the adhesion sheet 200 at a position above the adhesion sheet 200 and the blade edge 39A of the second blade 39 cuts the adhesion sheet 200 at a position below the adhesion sheet 200. Therefore, the adhesion sheet 200 may be properly cut to have a clean-cut edge 200S (depicted in FIG. 11B), preventing dropping of toner particles and formation of a cracked toner image. In other words, the blade edge 38A and the blade edge 39A contact the upper surface 200A and the lower surface 200B of the adhesion sheet 200, respectively, to cut the adhesion sheet 200, preventing deformation of the adhesive layer 91B of the adhesion sheet 200 near the cut edge 200S. As a result, the clean-cut edge 200S may prevent dropping of toner particles and formation of a cracked toner image.

The first blade 38 and the second blade 39 oppose the upper surface 200A and the lower surface 200B of the adhesion sheet 200, respectively, in such a manner that the blade edge 38A and the blade edge 39A oppose each other via the adhesion sheet 200. The first blade 38 and the second blade 39 move up and down so that the blade edge 38A and the blade edge 39A cut the adhesion sheet 200 by applying forces having a similar strength to both sides of the adhesion sheet 200, thereby reducing deformation of layers included in the adhesion sheet 200. For example, a decreased force may be applied to a mirror image 100A forming an intermediate layer, preventing formation of a cracked toner image and separation of the first sheet 100 from the second sheet 91. As a result, a high-quality photographic image may be formed in the adhesion sheet 200 having the clean-cut edge 200S.

As illustrated in FIG. 9, after the left border 200C and the right border 200E of the adhesion sheet 200 are cut, the adhesion sheet 200 is conveyed in the direction C until a bottom edge of the adhesion sheet 200 contacts the guide 48. After the guide 48 regulates a position of the adhesion sheet 200, the pusher 49 pushes the adhesion sheet 200 in a direction D toward the second cutter 42.

The second cutter 42 has a structure similar to the structure of the first cutter 41. For example, the fifth rotary blade 50 and the sixth rotary blade 51, serving as first blades, are attached to the shaft 52 in such a manner that the fifth rotary blade 50 and the sixth rotary blade 51 rotate on the adhesion sheet 200. As illustrated in FIG. 4, the seventh rotary blade 55 and the eighth rotary blade 56, serving as second blades, are rotatably attached to the shaft 57 and oppose the fifth rotary blade 50 and the sixth rotary blade 51, respectively. Namely, the fifth rotary blade 50 and the seventh rotary blade 55 form a pair of blades and the sixth rotary blade 51 and the eighth rotary blade 56 form another pair of blades. As illustrated in FIG. 9, the convey roller pair 53 (e.g., rubber rollers), serving as a conveyance member, is provided between the fifth rotary blade 50 and the sixth rotary blade 51 and conveys the adhesion sheet 200 in the direction D. The driver 54 drives the fifth rotary blade 50, the sixth rotary blade 51, the seventh rotary blade 55, and the eighth rotary blade 56 (depicted in FIG. 4). When the adhesion sheet 200 is conveyed in the direction D, the fifth rotary blade 50 and the seventh rotary blade 55 cut the top border 200F of the adhesion sheet 200 and the sixth rotary blade 51 and the eighth rotary blade 56 cut the bottom border 200D of the adhesion sheet 200.

The sensors 61 and 62, serving as detectors, are provided in the first cutter 41 and detect the leading edge and the trailing edge of the adhesion sheet 200. The controller 104 (depicted in FIG. 4) controls the driver 44 according to a detection signal output by the sensors 61 and 62. For example, when the sensor 61 detects the leading edge of the adhesion sheet 200, the controller 104 drives the driver 44 to start rotating the first rotary blade 381, the second rotary blade 382, the third rotary blade 391, and the fourth rotary blade 392 (depicted in FIG. 10). When the sensor 62 detects the trailing edge of the adhesion sheet 200, the controller 104 stops the driver 44 to stop rotating the first rotary blade 381, the second rotary blade 382, the third rotary blade 391, and the fourth rotary blade 392.

The sensors 63 and 64, serving as detectors, are provided in the second cutter 42 and detect the leading edge and the trailing edge of the adhesion sheet 200. The controller 104 controls the driver 54 according to a detection signal output by the sensors 63 and 64. For example, when the sensor 63 detects the leading edge of the adhesion sheet 200, the controller 104 drives the driver 54 to start rotating the fifth rotary blade 50, the sixth rotary blade 51, the seventh rotary blade 55, and the eighth rotary blade 56 (depicted in FIG. 4). When the sensor 64 detects the trailing edge of the adhesion sheet 200, the controller 104 stops the driver 54 to stop rotating the fifth rotary blade 50, the sixth rotary blade 51, the seventh rotary blade 55, and the eighth rotary blade 56. Thus, the controller 104 serves as a driver controller for controlling the drivers 44 and 54.

The controller 104 controls the driver 44 to start and stop rotating the first rotary blade 381, the second rotary blade 382, the third rotary blade 391, and the fourth rotary blade 392, so as to cut the left border 200C and the right border 200E of the adhesion sheet 200, when the sensors 61 and 62 detect the leading edge and the trailing edge of the adhesion sheet 200, respectively. Similarly, the controller 104 controls the driver 54 to start and stop rotating the fifth rotary blade 50, the sixth rotary blade 51, the seventh rotary blade 55, and the eighth rotary blade 56, so as to cut the top border 200F and the bottom border 200D of the adhesion sheet 200, when the sensors 63 and 64 detect the leading edge and the trailing edge of the adhesion sheet 200, respectively. Therefore, the sheet cutter 40 may consume reduced power.

As illustrated in FIG. 10, a distance L1 is provided between the first rotary blade 381 and the second rotary blade 382. A distance L2 is provided between the third rotary blade 391 and the fourth rotary blade 392. As illustrated in FIG. 4, a distance L3 is provided between the fifth rotary blade 50 and the sixth rotary blade 51. A distance L4 is provided between the seventh rotary blade 55 and the eighth rotary blade 56. The distances L1, L2, L3, and L4 are changeable in accordance with size (e.g., width and/or length) of the adhesion sheet 200. For example, a user may operate a control panel (not shown) provided on the image forming apparatus 1A (depicted in FIG. 2) to select a desired size (e.g., A4 size, A5 size, or the like). Accordingly, the distances L1, L2, L3, and L4 are automatically adjusted in accordance with the selected size, so that the adhesion sheet 200 may be cut properly to have a shape corresponding to the desired size.

As illustrated in FIG. 2, the sheet cutter 40 is installed in the image forming apparatus 1A together with the sheet adhering device 9. As illustrated in FIG. 4, in the sheet adhering device 9, the pressing rollers 95A and 95B adhere a first sheet 100 to a second sheet 91 to form an adhesion sheet 200. The sheet cutter 40, which is provided downstream from the sheet adhering device 9 in a conveyance direction of the adhesion sheet 200, cuts the left border 200C, the right border 200E, the top border 200F, and the bottom border 200D (depicted in FIG. 9) of the adhesion sheet 200, and feeds the cut adhesion sheet 200 toward the tray 102.

As illustrated in FIG. 9, according to this example embodiment, the pairs of blades formed of the first blade (e.g., the first rotary blade 381 and the second rotary blade 382) and the second blade (e.g., the third rotary blade 391 and the fourth rotary blade 392 depicted in FIG. 10) cut the left border 200C and the right border 200E of the adhesion sheet 200, respectively, and the pairs of blades formed of the first blade (e.g., the fifth rotary blade 50 and the sixth rotary blade 51) and the second blade (e.g., the seventh rotary blade 55 and the eighth rotary blade 56 depicted in FIG. 4) cut the top border 200F and the bottom border 200D of the adhesion sheet 200, so that the adhesion sheet 200 may have clean-cut edges. Accordingly, the sheet cutter 40 may reduce dropping of toner particles and formation of a cracked toner image.

The rotary blades (e.g., the first rotary blade 381, the second rotary blade 382, the third rotary blade 391, and the fourth rotary blade 392 depicted in FIG. 10, and the fifth rotary blade 50, the sixth rotary blade 51, the seventh rotary blade 55, and the eighth rotary blade 56 depicted in FIG. 4) cut the borders (e.g., the left border 200C, the right border 200E, the top border 200F, and the bottom border 200D) of the adhesion sheet 200 while the conveyance members (e.g., the convey rollers 46A and 46B depicted in FIG. 10 and the convey roller pair 53 depicted in FIG. 9) convey the adhesion sheet 200. Therefore, the sheet cutter 40 may have a compact size. Further, the sheet cutter 40 may cut the adhesion sheet 200 to have the properly-cut edge surfaces easily and precisely with a decreased driving force.

The two pairs of the first blade and the second blade (e.g., the pair of the first rotary blade 381 and the third rotary blade 391 and the pair of the second rotary blade 382 and the fourth rotary blade 392) may cut the left border 200C and the right border 200E simultaneously, resulting in a decreased cut operation. Similarly, the two pairs of the first blade and the second blade (e.g., the pair of the fifth rotary blade 50 and the seventh rotary blade 55 and the pair of the sixth rotary blade 51 and the eighth rotary blade 56) may cut the top border 200F and the bottom border 200D simultaneously, resulting in a decreased cut operation.

Figure 12:
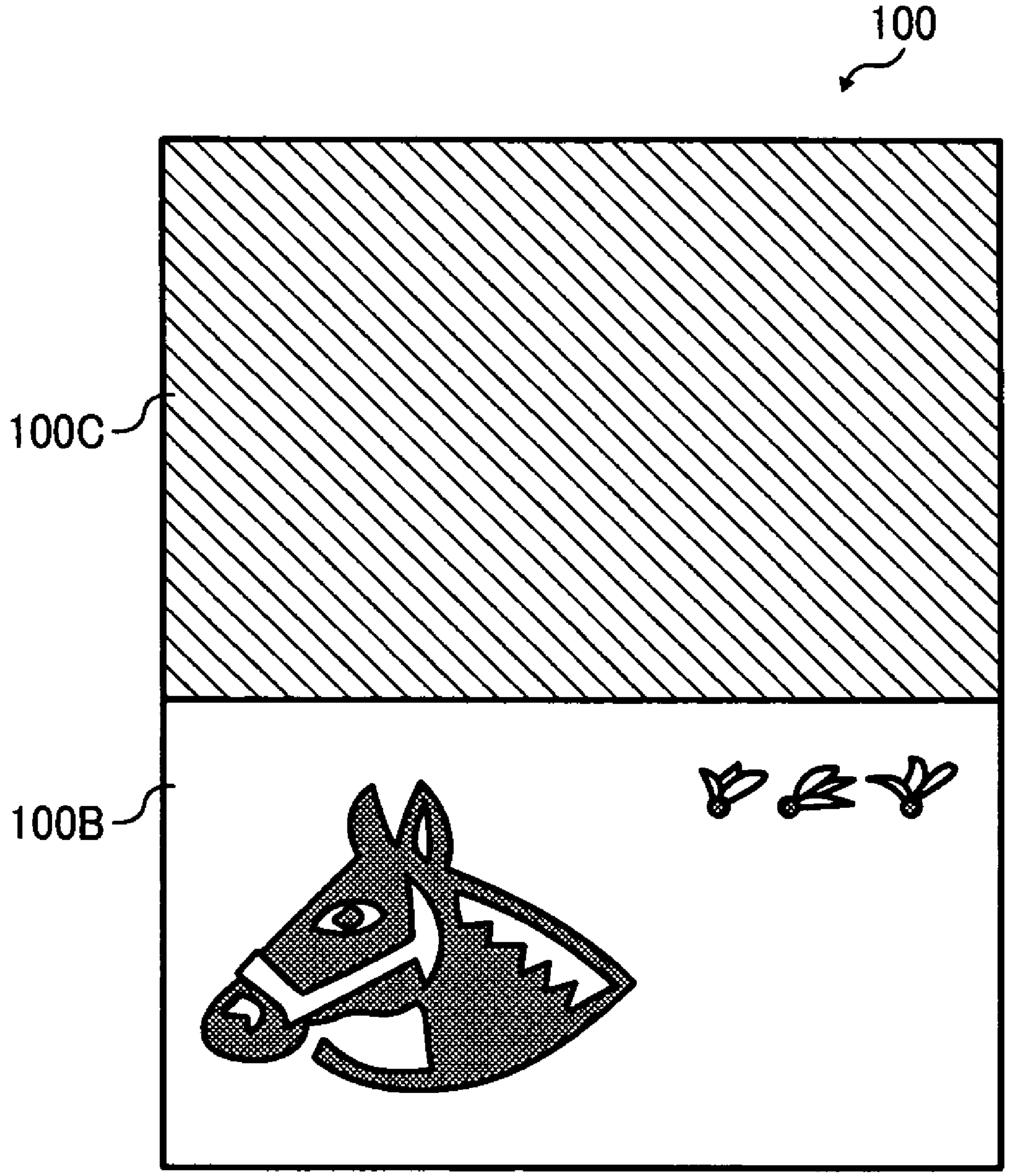
FIG. 12 is a plane view (according to an example embodiment) of one example of a first sheet used in the adhesion sheet shown in FIG. 6.

According to this example embodiment, a wholly transparent sheet is used as a first sheet 100. However, a first sheet 100 may include a transparent portion 100B and a non-transparent portion 100C, as illustrated in FIG. 12. Namely, the first sheet 100 may be partially transparent.

As illustrated in FIG. 6, according to this example embodiment, the second sheet 91 includes a white sheet serving as the base layer 91A and the transparent adhesive layer 91B layered on the base layer 91A. However, a transparent sheet may be used as the base layer 91A and a white pigment may be added to the adhesive layer 91B to produce the non-transparent adhesive layer 91B.

According to this example embodiment, both the first blade and the second blade are the rotary blades rotatable around the shaft (e.g., the first rotary blade 381 and the second rotary blade 382 rotatable around the shaft 43 depicted in FIG. 10, the third rotary blade 391 and the fourth rotary blade 392 rotatable around the shaft 45 depicted in FIG. 10, the fifth rotary blade 50 and the sixth rotary blade 51 rotatable around the shaft 52 depicted in FIG. 4, and the seventh rotary blade 55 and the eighth rotary blade 56 rotatable around the shaft 57 depicted in FIG. 4). However, the first blade and the second blade may be pivot blades instead of the rotary blades as illustrated in FIGS. 13A, 13B, 13C, and 13D.

Figure 13A:
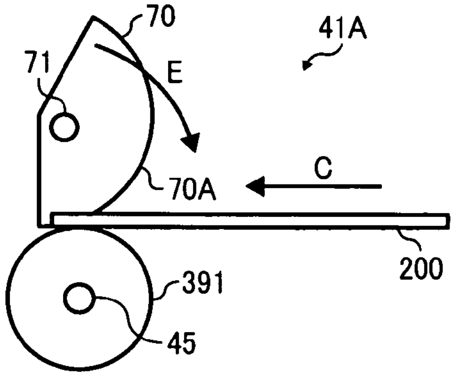
FIG. 13A is a side view (according to an example embodiment) of a modification example of a blade included in the sheet cutter shown in FIG. 9.

FIG. 13A illustrates a first cutter 41A including a pivot blade. The first cutter 41A includes a pivot blade 70 instead of the first rotary blade 381 (depicted in FIG. 10). The pivot blade 70 includes a support axis 71 and/or a blade edge 70A. The other elements of the first cutter 41A are common to the first cutter 41 depicted in FIG. 10.

The first cutter 41A includes the pivot blade 70 as a first blade. The pivot blade 70 is supported at the support axis 71 provided at one end of the pivot blade 70. The blade edge 70A is provided at another end of the pivot blade 70 and is pivoted about the support axis 71 in a direction E.

Figure 13B:
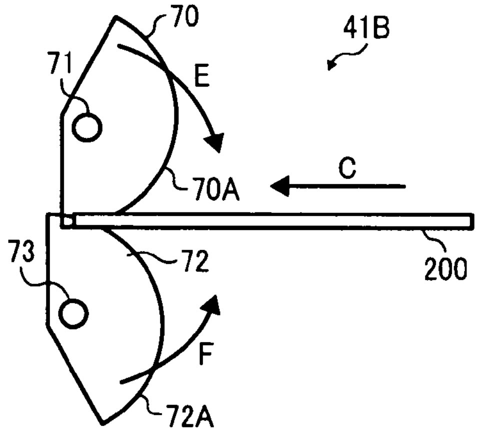
FIG. 13B is a side view (according to an example embodiment) of another modification example of a blade included in the sheet cutter shown in FIG. 9.

FIG. 13B illustrates a first cutter 41B including pivot blades. The first cutter 41B includes a pivot blade 72 instead of the third rotary blade 391 (depicted in FIG. 13A). The pivot blade 72 includes a support axis 73 and/or a blade edge 72A. The other elements of the first cutter 41B are common to the first cutter 41A depicted in FIG. 13A.

The first cutter 41B includes the pivot blade 70 as a first blade and the pivot blade 72 as a second blade. The pivot blade 70 is supported at the support axis 71 provided at one end of the pivot blade 70. The blade edge 70A is provided at another end of the pivot blade 70 and is pivoted about the support axis 71 in the direction E. The pivot blade 72 is supported at the support axis 73 provided at one end of the pivot blade 72. The blade edge 72A is provided at another end of the pivot blade 72 and is pivoted about the support axis 73 in a direction F.

Figure 13C:
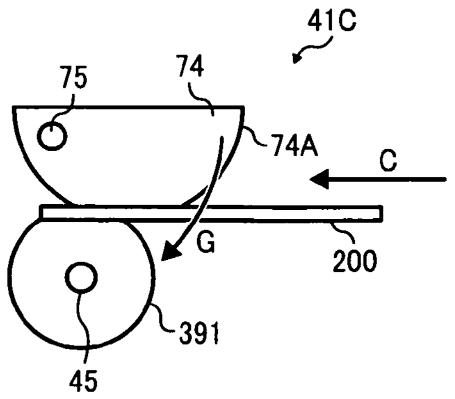
FIG. 13C is a side view (according to an example embodiment) of yet another modification example of a blade included in the sheet cutter shown in FIG. 9.

FIG. 13C illustrates a first cutter 41C including a pivot blade. The first cutter 41C includes a pivot blade 74 instead of the first rotary blade 381 (depicted in FIG. 10). The pivot blade 74 includes a support axis 75 and/or a blade edge 74A. The other elements of the first cutter 41C are common to the first cutter 41 depicted in FIG. 10.

The first cutter 41C includes the pivot blade 74 as a first blade. The pivot blade 74 is supported at the support axis 75 provided at one end of the pivot blade 74. The blade edge 74A is provided at another end of the pivot blade 74 and is pivoted about the support axis 75 in a direction G.

Figure 13D:
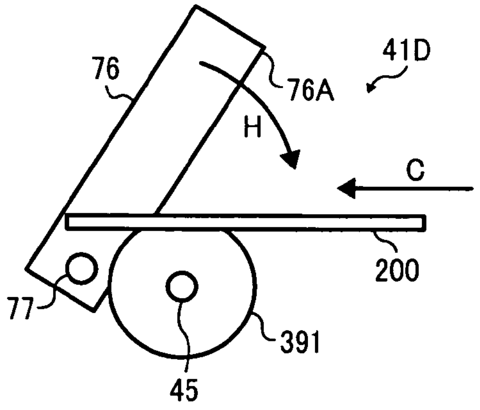
FIG. 13D is a side view (according to an example embodiment) of yet another modification example of a blade included in the sheet cutter shown in FIG. 9.

FIG. 13D illustrates a first cutter 41D including a pivot blade. The first cutter 41D includes a pivot blade 76 instead of the first rotary blade 381 (depicted in FIG. 10). The pivot blade 76 includes a support axis 77 and/or a blade edge 76A. The other elements of the first cutter 41D are common to the first cutter 41 depicted in FIG. 10.

The first cutter 41D includes the pivot blade 76 as a first blade. The pivot blade 76 is supported at the support axis 77 at one end of the pivot blade 76. The blade edge 76A is provided at another end of the pivot blade 76 and is pivoted about the support axis 77 in a direction H.

Alternatively, the first blade and the second blade may be parallel blades. For example, each of the first blade and the second blade may be a parallel blade including a blade edge parallel to a border of an adhesion sheet 200. The first blade and the second blade move up and down to cut the adhesion sheet 200.

As illustrated in FIG. 9, according to this example embodiment, two pairs of the first blade and the second blade cut the left border 200C and the right border 200E of the adhesion sheet 200, and another two pairs of the first blade and the second blade cut the top border 200F and the bottom border 200D. However, in order to form a plurality of photographic images by cutting a center portion of the adhesion sheet 200, three or more pairs of the first blade and the second blade may be provided.

Figure 14:
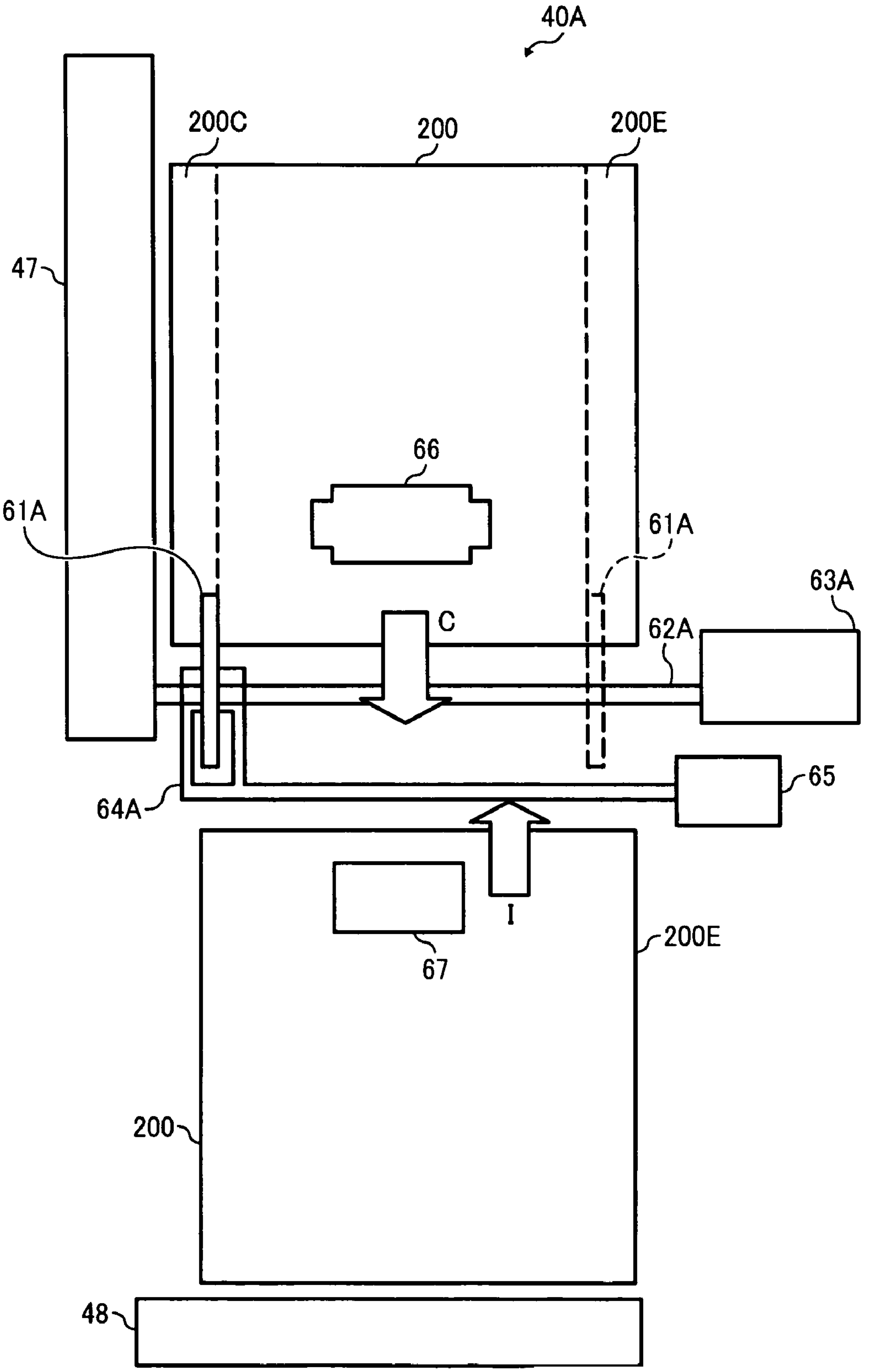
FIG. 14 is a plane view of a sheet cutter according to another example embodiment.

Referring to FIG. 14, the following describes a sheet cutter 40A according to another example embodiment. FIG. 14 is a plane view of the sheet cutter 40A. The sheet cutter 40A includes a first rotary blade 61A, a shaft 62A, a driver 63A, a support member 64A, a driver 65, and/or convey roller pairs 66 and 67.

The sheet cutter 40A includes a pair of rotary blades, that is, the first rotary blade 61A and a second rotary blade (not shown, e.g., the third rotary blade 391 depicted in FIG. 10). The first rotary blade 61A, serving as a first blade, and the second rotary blade, serving as a second blade, cut a left border 200C and a right border 200E of an adhesion sheet 200. The shaft 62A supports the first rotary blade 61A. Another shaft (not shown, e.g., the shaft 45 depicted in FIG. 10) supports the second rotary blade. The driver 63A is connected to the shaft 62A supporting the first rotary blade 61A and the shaft supporting the second rotary blade to drive the first rotary blade 61A and the second rotary blade. The support member 64A supports both side surfaces of the first rotary blade 61A and both side surfaces of the second rotary blade.

The support member 64A holds the first rotary blade 61A and the second rotary blade at a position corresponding to the left border 200C of the adhesion sheet 200, so that the rotating first rotary blade 61A and the rotating second rotary blade cut the left border 200C of the adhesion sheet 200.

A controller (e.g., the controller 104 depicted in FIG. 4) controls the driver 65 (e.g., a stepping motor) to drive and move the support member 64A in a direction parallel to the shaft 62A. After the first rotary blade 61A and the second rotary blade cut the left border 200C of the adhesion sheet 200, the driver 65 drives the support member 64A to move the first rotary blade 61A and the second rotary blade on the shaft 62A and the shaft supporting the second rotary blade, respectively, to a position corresponding to the right border 200E of the adhesion sheet 200. Thus, the support member 64A holds the first rotary blade 61A and the second rotary blade at the position corresponding to the right border 200E of the adhesion sheet 200.

The convey roller pairs 66 and 67, serving as conveyance members and backward conveyance members, nip the adhesion sheet 200 and rotate to convey the adhesion sheet 200 in the direction C. While the rotating convey roller pairs 66 and 67 convey the adhesion sheet 200, the rotating first rotary blade 61A and the rotating second rotary blade opposing the first rotary blade 61A cut the left border 200C of the adhesion sheet 200. When a leading edge of the adhesion sheet 200 contacts the guide 48 and thereby the guide 48 aligns the adhesion sheet 200, the convey roller pairs 66 and 67 stop rotating.

The support member 64A moves in parallel with the shaft 62A to the position corresponding to the right border 200E of the adhesion sheet 200 and holds the first rotary blade 61A and the second rotary blade at the position corresponding to the right border 200E of the adhesion sheet 200. The convey roller pairs 66 and 67, the shaft 62A, and the shaft supporting the second rotary blade rotate backward to convey the adhesion sheet 200 in a direction I, so that the first rotary blade 61A and the second rotary blade cut the right border 200E of the adhesion sheet 200.

The support member 64A, serving as a moving member, moves the first rotary blade 61A and the second rotary blade on the shaft 62A and the shaft supporting the second rotary blade, respectively. Therefore, the sheet cutter 40A may cut the left border 200C and the right border 200E of the adhesion sheet 200 at arbitrary positions. Thus, even when the adhesion sheet 200 has various sizes, the sheet cutter 40A may easily produce an adhesion sheet 200 bearing a photographic image and having a desired size.

Alternatively, to cope with adhesion sheets 200 having various sizes, the first rotary blade 61A and the second rotary blade may be provided at a fixed position, and an adhesion sheet 200 may move right and left to positions corresponding to a left border 200C and a right border 200E of the adhesion sheet 200. In this case, after the convey roller pairs 66 and 67 rotate to convey the adhesion sheet 200 in the direction C, the adhesion sheet 200 is moved to a position at which the first rotary blade 61A and the second rotary blade cut the right border 200E of the adhesion sheet 200. The convey roller pairs 66 and 67 rotate backward to cut the right border 200E of the adhesion sheet 200.

As described above, according to this example embodiment, the first blade (e.g., the first rotary blade 61A) and the second blade (e.g., the second rotary blade), which form a pair of blades, move in parallel to each other along the shaft (e.g., the shaft 62A) or the adhesion sheet 200 moves in a direction perpendicular to blade surfaces of the first blade and the second blade. Thus, the borders (e.g., the left border 200C and the right border 200E) of the adhesion sheet 200 may be cut properly regardless of variation in size of the adhesion sheet 200.

Figure 15:
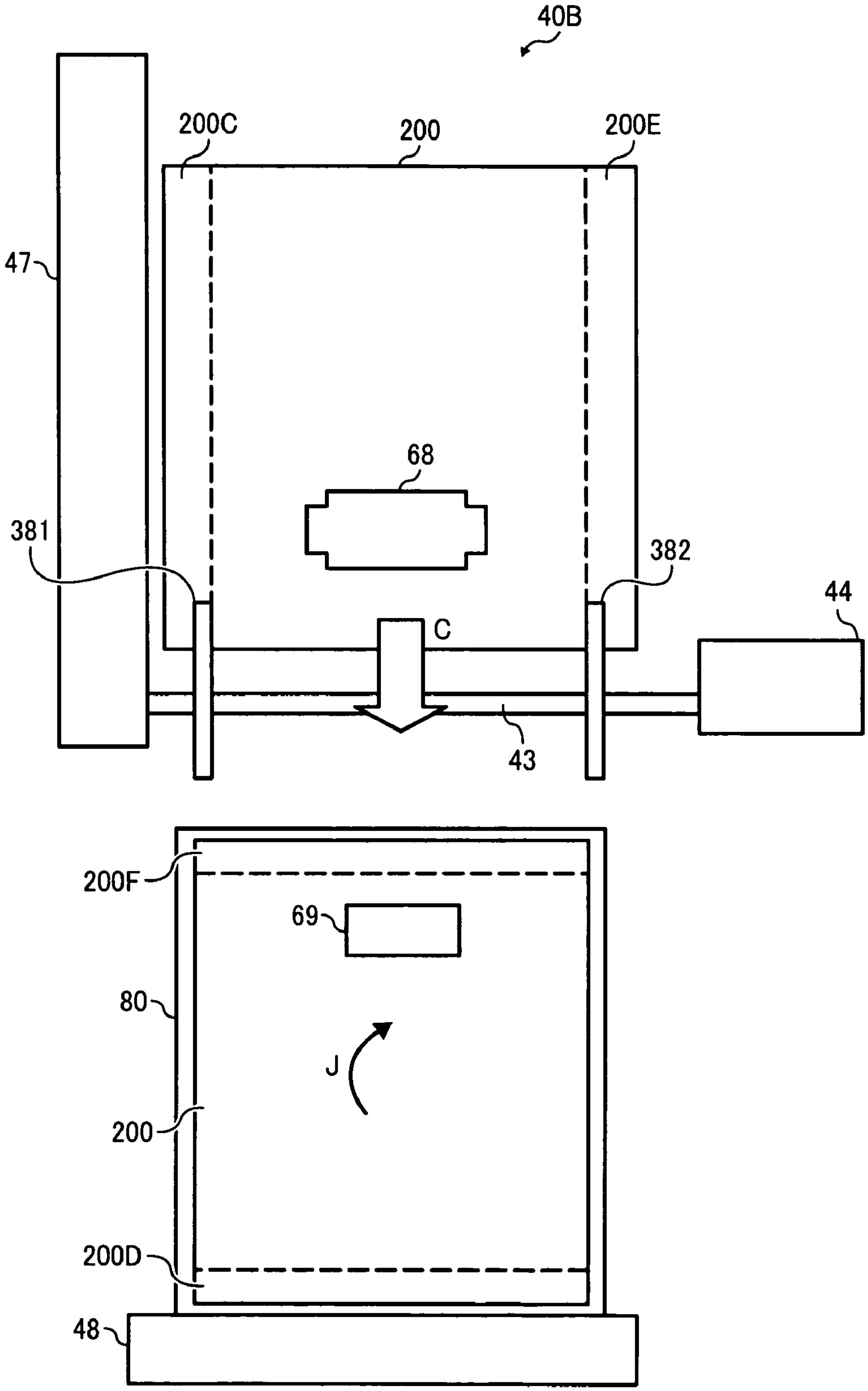
FIG. 15 is a plane view of a sheet cutter according to yet another example embodiment.

In the sheet cutter 40 (depicted in FIG. 9), the first cutter 41 (depicted in FIG. 9) cuts the left border 200C and the right border 200E of the adhesion sheet 200 and the second cutter 42 (depicted in FIG. 9) cuts the top border 200F and the bottom border 200D of the adhesion sheet 200. However, a single cutter may cut the four borders, which are, the left border 200C, the right border 200E, the top border 200F, and the bottom border 200D of the adhesion sheet 200. Referring to FIG. 15, the following describes a sheet cutter 40B according to yet another example embodiment, which cuts the four borders.

FIG. 15 is a plane view of the sheet cutter 40B. The sheet cutter 40B includes convey roller pairs 68 and 69 instead of the convey rollers 46A and 46B (depicted in FIG. 10) and/or a receiver 80. The other elements of the sheet cutter 40B are common to the first cutter 41 (depicted in FIG. 9).

After the first rotary blade 381, the second rotary blade 382, the third rotary blade 391, and the fourth rotary blade 392 (depicted in FIG. 10) cut a left border 200C and a right border 200E of an adhesion sheet 200, the convey roller pairs 68 and 69, serving as conveyance members, feed the adhesion sheet 200 toward the guide 48 so that the adhesion sheet 200 contacts the guide 48. Namely, the convey roller pairs 68 and 69 convey the adhesion sheet 200 onto the receiver 80, serving as a rotating member. When the receiver 80 receives the adhesion sheet 200, the convey roller pair 69 separates from the adhesion sheet 200 and the receiver 80 turns by 90 degrees around its center in a direction J so that a top border 200F and a bottom border 200D of the adhesion sheet 200 are parallel to the first rotary blade 381 and the second rotary blade 382.

The convey roller pair 69, serving as a backward conveyance member, nips the adhesion sheet 200 again and rotates backward to feed the adhesion sheet 200 in a direction opposite to the direction C. The convey roller pair 69 rotating backward causes the first rotary blade 381, the second rotary blade 382, and the convey roller pair 68 to rotate backward. Accordingly, the first rotary blade 381 and the third rotary blade 391 cut the bottom border D of the adhesion sheet 200, and the second rotary blade 382 and the fourth rotary blade 392 cut the top border 200F of the adhesion sheet 200.

According to this example embodiment, a single cutter (e.g., the sheet cutter 40B) may cut the left border 200C, the right border 200E, the top border 200F, and the bottom border 200D of the adhesion sheet 200 by using the receiver 80 for turning the adhesion sheet 200 by 90 degrees. As a result, the sheet cutter 40B may have a compact size and may be manufactured at reduced costs.

An adhesion sheet 200 may include sheets formed of different materials. For example, as illustrated in FIG. 6, according to the above-described example embodiments, the adhesion sheet 200 includes a transparent first sheet 100 and a non-transparent second sheet 91. The first sheet 100 and the second sheet 91 have different surface hardnesses and surface friction coefficients, respectively. Therefore, when the first blade (e.g., the first rotary blade 381, the second rotary blade 382, the fifth rotary blade 50, and the sixth rotary blade 51 depicted in FIG. 9) and the second blade (e.g., the third rotary blade 391 and the fourth rotary blade 392 depicted in FIG. 10 and the seventh rotary blade 55 and the eighth rotary blade 56 depicted in FIG. 4) have a common thickness, the first sheet 100 and the second sheet 91, which form front and back surfaces of the adhesion sheet 200, respectively, may not be cut similarly. As a result, the adhesion sheet 200 may not be conveyed in a proper direction and thereby may be jammed. Further, the cut borders of the adhesion sheet 200 may be entangled between the first blade and the second blade. To address those problems, the first blade and the second blade may have thicknesses different from each other.

Figure 16:
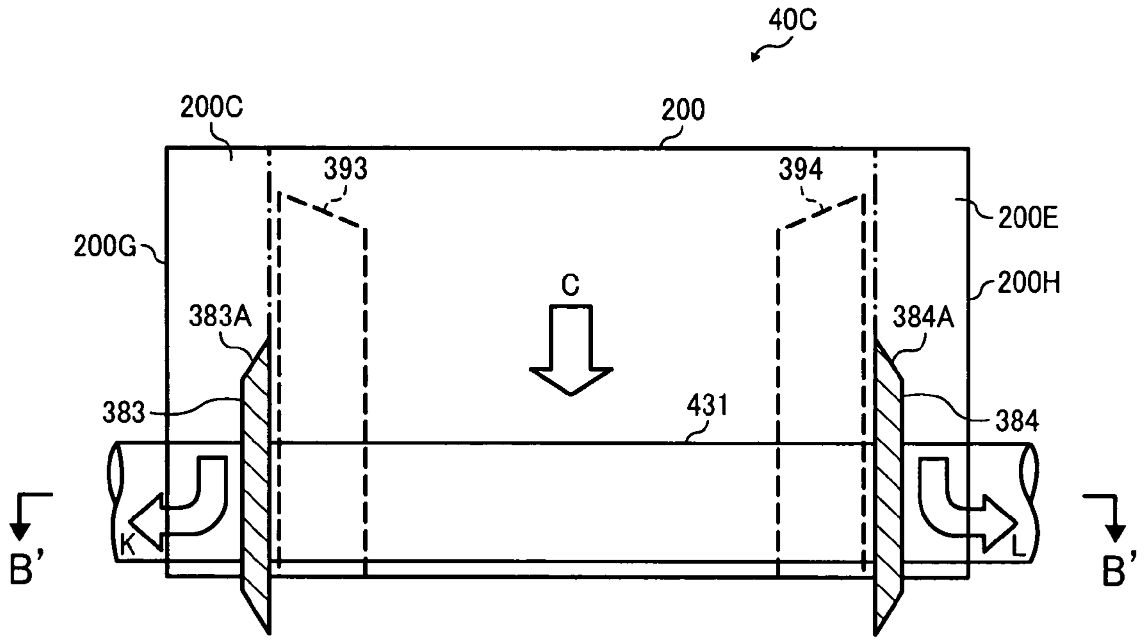
FIG. 16 is a plane view of a sheet cutter according to yet another example embodiment.
Figures 17, 18:
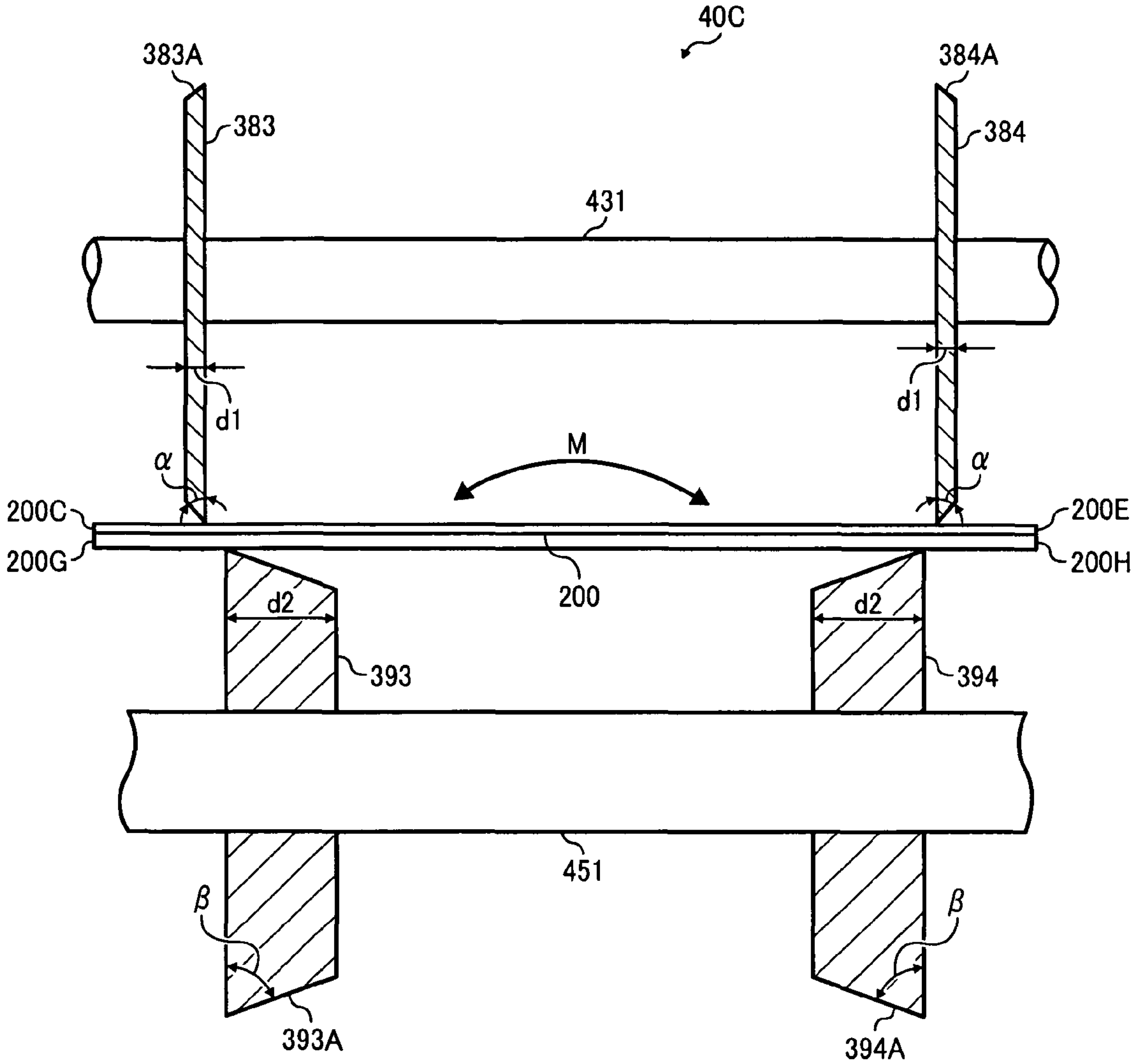
FIG. 17 is a sectional view of the sheet cutter taken on line B'-B' in FIG. 16.
FIG. 18 is a lookup table showing test results for evaluating quality of cut section of the adhesion sheet shown in FIG. 6.

Referring to FIGS. 16 and 17, the following describes a sheet cutter 40C according to yet another example embodiment including a first blade and a second blade having thicknesses different from each other. FIG. 16 is a plane view of the sheet cutter 40C. FIG. 17 is a sectional view of the sheet cutter 40C taken on line B'-B' in FIG. 16. As illustrated in FIG. 16, the sheet cutter 40C includes a first rotary blade 383, a second rotary blade 384, and/or a shaft 431. The first rotary blade 383 includes a blade edge 383A. The second rotary blade 384 includes a blade edge 384A. As illustrated in FIG. 17, the sheet cutter 40C further includes a third rotary blade 393, a fourth rotary blade 394, and/or a shaft 451. The third rotary blade 393 includes a blade edge 393A. The fourth rotary blade 394 includes a blade edge 394A.

As illustrated in FIG. 17, the first rotary blade 383 and the second rotary blade 384 serve as first blades and the third rotary blade 393 and the fourth rotary blade 394 serve as second blades. The first rotary blade 383 and the second rotary blade 384 oppose the third rotary blade 393 and the fourth rotary blade 394, respectively. Each of the first rotary blade 383 and the second rotary blade 384 has a disk-like shape having a thickness d1 of about 1.4 mm and a diameter of about 30 mm. Each of the third rotary blade 393 and the fourth rotary blade 394 has a disk-like shape having a thickness d2 of about 6.4 mm and a diameter of about 30 mm. Namely, each of the first rotary blade 383 and the second rotary blade 384 has the thickness smaller than the thickness of the third rotary blade 393 and the fourth rotary blade 394.

The blade edges 383A and 384A form an angle $\alpha$ (e.g., a blade angle) in a range of from about 30 degrees to about 70 degrees (e.g., about 45 degrees according to this example embodiment) with respect to edges 200G and 200H of an adhesion sheet 200, respectively. The blade edges 393A and 394A form an angle $\beta$ (e.g., a blade angle) in a range of from about 70 degrees to about 90 degrees (e.g., about 85 degrees according to this example embodiment), so that slopes formed by the angle $\beta$ on the blade edges 393A and 394A face each other.

The shaft 431 connects the first rotary blade 383 to the second rotary blade 384 and rotates the first rotary blade 383 and the second rotary blade 384. The shaft 451 connects the third rotary blade 393 to the fourth rotary blade 394 and rotates the third rotary blade 393 and the fourth rotary blade 394. When the shafts 431 and 451 rotate and the first rotary blade 383, the second rotary blade 384, the third rotary blade 393, and the fourth rotary blade 394 cut a left border 200C and a right border 200E of an adhesion sheet 200, the cut left border 200C and the cut right border 200E fall in directions K and L, respectively, as illustrated in FIG. 16, and thereby may not be entangled in the first rotary blade 383, the second rotary blade 384, the third rotary blade 393, the fourth rotary blade 394, and the shafts 431 and 451. The first rotary blade 383 and the second rotary blade 384 are provided in the outer sides of the third rotary blade 393 and the fourth rotary blade 394, respectively. Namely, the first rotary blade 383 and the second rotary blade 384 are provided closer to the edges 200G and 200H of the adhesion sheet 200 than the third rotary blade 393 and the fourth rotary blade 394 are, respectively. Further, the first rotary blade 383 and the second rotary blade 384 have thinner blades than the third rotary blade 393 and the fourth rotary blade 394, respectively. Accordingly, a tensile force for pulling the adhesion sheet 200 from a center toward the edges 200G and 200H of the adhesion sheet 200 is applied in directions M, as illustrated in FIG. 17. Thus, the adhesion sheet 200 may be conveyed properly along the direction C (depicted in FIG. 16). Namely, the adhesion sheet 200 may not be conveyed obliquely.

The adhesion sheet 200 may be conveyed along the direction C, when one of the first blade (e.g., the first rotary blade 383 and the second rotary blade 384) and the second blade (e.g., the third rotary blade 393 and the fourth rotary blade 394) has a thinner blade than another one of the first blade and the second blade, especially when the thinner blade is provided closer to the edge (e.g., the edges 200G and 200H) of the adhesion sheet 200 than the thicker blade is. The adhesion sheet 200 may be conveyed along the direction C more efficiently, when the blade edge (e.g., the blade edges 383A and 384A) of the thinner blade forms a slope facing the edge of the adhesion sheet 200 at the angle $\alpha$ in a range of from about 30 degrees to about 70 degrees and the blade edge (e.g., the blade edges 393A and 394A) of the thicker blade forms a slope facing the center of the adhesion sheet 200 at the angle $\beta$ in a range of from about 70 degrees to about 90 degrees.

As illustrated in FIG. 6, according to the above-described example embodiments, an adhesion sheet 200 is produced by adhering a transparent first sheet 100, including plastic, to a non-transparent second sheet 91, such as white paper, including a material different from the material of the first sheet 100. Quality of cut section may vary depending on whether the thinner blade contacts the first sheet 100 or the second sheet 91.

FIG. 18 illustrates test results for evaluating the quality of cut section of an adhesion sheet 200 (depicted in FIG. 6) when the thinner blade contacts a transparent sheet (e.g., the first sheet 100 depicted in FIG. 6) and a non-transparent sheet (e.g., the second sheet 91 depicted in FIG. 6) and when the thinner blade is provided closer to an edge of the adhesion sheet 200 and closer to a center of the adhesion sheet 200 than the thicker blade is.

In FIG. 18, a test result (1) shows that when the thinner blade was provided closer to the center of the adhesion sheet 200 than the thicker blade was and contacted the non-transparent sheet, the adhesion sheet 200 was not cut properly and a cut section of the adhesion sheet 200 was faulty. A test result (2) shows that when the thinner blade was provided closer to the center of the adhesion sheet 200 than the thicker blade was and contacted the transparent sheet, a cut border of the adhesion sheet 200 was entangled in the thinner blade and/or the thicker blade. A test result (3) shows that when the thinner blade was provided closer to the edge of the adhesion sheet 200 than the thicker blade was and contacted the non-transparent sheet, the adhesion sheet 200 was not cut properly and a cut section of the adhesion sheet 200 was faulty. A test result (4) shows that when the thinner blade was provided closer to the edge of the adhesion sheet 200 than the thicker blade was and contacted the transparent sheet, the adhesion sheet 200 was cut properly and a cut section of the adhesion sheet 200 was clean. The above results reveal that the thinner blade may be preferably provided closer to the edge of the adhesion sheet 200 than the thicker blade and may preferably contact the transparent sheet.

As illustrated in FIG. 6, an adhesion sheet (e.g., the adhesion sheet 200) is produced by adhering a first sheet (e.g., the first sheet 100) to a second sheet (e.g., the second sheet 91). At least a part of the first sheet is transparent and a surface of the transparent part bears a mirror image (e.g., the mirror image 100A). The second sheet is non-transparent and includes an adhesive layer (e.g., the adhesive layer 91B) on its surface. The first sheet and the second sheet are attached to each other in such a manner that the mirror image on the first sheet opposes the adhesive layer of the second sheet.

As illustrated in FIGS. 11A and 11B, a cutter (e.g., the sheet cutter 40) includes a pair of blades formed of a first blade (e.g., the first blade 38) and a second blade (e.g., the second blade 39). The first blade and the second blade oppose each other via an adhesion sheet (e.g., the adhesion sheet 200) in such a manner that blade edges (e.g., the blade edges 38A and 39A) of the first blade and the second blade, respectively, cut a border of the adhesion sheet. Thus, the cutter or an image forming apparatus (e.g., the image forming apparatus 1A depicted in FIG. 2) including the cutter may form a high-quality glossy image in the adhesion sheet having a clean-cut edge easily and precisely.

The present invention has been described above with reference to specific example embodiments. Nonetheless, the present invention is not limited to the details of example embodiments described above, but various modifications and improvements are possible without departing from the spirit and scope of the present invention. It is therefore to be understood that within the scope of the associated claims, the present invention may be practiced otherwise than as specifically described herein. For example, elements and/or features of different illustrative example embodiments may be combined with each other and/or substituted for each other within the scope of the present invention.

What is claimed is:

1. A sheet cutter to cut an adhesion sheet, the sheet cutter comprising:

a pair of blades including a first blade having a blade edge and a second blade opposing the first blade and having a blade edge, the pair of blades configured to cut a border of the adhesion sheet;

a moving member to move the adhesion sheet in a direction perpendicular to blade surfaces of the first blade and the second blade;

a backward conveyance member to feed the adhesion sheet backward; and a controller to control the moving member and the backward conveyance member, wherein the adhesion sheet formed by adhering a first sheet, at least a part of which is transparent and bears a mirror image, to a non-transparent second sheet including an adhesive layer, to oppose the mirror image on the first sheet against the adhesive layer of the second sheet, and wherein, after the first blade and the second blade cut a first border of the adhesion sheet, the moving member moves the adhesion sheet in the direction perpendicular to the blade surfaces of the first blade and the second blade, and the backward conveyance member feeds the adhesion sheet backward, so that the first blade and the second blade cut a second border of the adhesion sheet opposing the first border.

2. The sheet cutter according to claim 1, wherein at least one of the pair of blades includes a disk-like rotary blade comprising:

a rotation axis provided at a center of the rotary blade; and a blade edge provided on an outer circumferential edge of the rotary blade, and wherein the blade edge of the rotary blade and the blade edge of another one of the pair of blades cut the border of the adhesion sheet.

3. The sheet cutter according to claim 1, wherein at least one of the pair of blades includes a pivot blade comprising:

a support axis provided at one end of the pivot blade; and a blade edge provided at another end of the pivot blade and pivotable about the support axis, and wherein the blade edge of the pivot blade and the blade edge of another one of the pair of blades cut the border of the adhesion sheet.

4. The sheet cutter according to claim 2, further comprising:

a driver to rotate the rotary blade; and a conveyance member to convey the adhesion sheet toward the blade edge of the rotary blade.

5. The sheet cutter according to claim 3, further comprising:

a driver to pivot the pivot blade; and a conveyance member to convey the adhesion sheet toward the blade edge of the pivot blade.

6. The sheet cutter according to claim 4, further comprising:

a detector to detect the adhesion sheet; and a controller to control the driver according to a detection signal output by the detector.

7. The sheet cutter according to claim 5, further comprising:

a detector to detect the adhesion sheet; and a controller to control the driver according to a detection signal output by the detector.

8. The sheet cutter according to claim 1, further comprising:

a second pair of blades formed of a first blade and a second blade and provided parallel to the first pair of blades at an opposite border of the adhesion sheet.

9. The sheet cutter according to claim 8, further comprising:

an adjustment member to adjust a distance between the first pair of blades and the second pair of blades.

10. The sheet cutter according to claim 9, wherein the distance between the first pair of blades and the second pair of blades is adjusted to a width of the adhesion sheet.

11. The sheet cutter according to claim 1, further comprising:

a moving member to move the first blade and the second blade parallel to each other in a direction perpendicular to blade surfaces of the first blade and the second blade;

a backward conveyance member to feed the adhesion sheet backward; and a controller to control the moving member and the backward conveyance member, wherein, after the first blade and the second blade cut a first border of the adhesion sheet, the moving member moves the first blade and the second blade in parallel to each other, and the backward conveyance member feeds the adhesion sheet backward, so that the first blade and the second blade cut a second border of the adhesion sheet opposing the first border.

12. The sheet cutter according to claim 1, further comprising:

a rotating member to rotate the adhesion sheet by about 90 degrees;

wherein, after the first blade and the second blade cut at least the first border of the adhesion sheet, the rotating member rotates the adhesion sheet by about 90 degrees, and the backward conveyance member feeds the adhesion sheet backward, so that the first blade and the second blade cut at least the second border of the adhesion sheet perpendicular to the first border.

13. The sheet cutter according to claim 1, further comprising:

a first cutter including at least one pair of blades formed of the first blade and the second blade to cut a border parallel to a first conveyance direction of the adhesion sheet;

a conveyance member to convey the adhesion sheet in a second conveyance direction perpendicular to the first conveyance direction; and a second cutter including at least another pair of blades formed of the first blade and the second blade to cut another border parallel to the second conveyance direction of the adhesion sheet.

14. The sheet cutter according to claim 1, wherein the first blade and the second blade are of unequal thicknesses.

15. The sheet cutter according to claim 14, wherein the thinner of the first blade and the second blade contacts the first sheet of the adhesion sheet.

16. The sheet cutter according to claim 14, wherein the thinner blade is provided closer to the border of the adhesion sheet than the thicker blade is.

17. The sheet cutter according to claim 14, wherein the thinner blade has a blade angle in a range of from about 30 degrees to about 70 degrees and the thicker blade has a blade angle in a range of from about 70 degrees to about 90 degrees.

18. An image forming apparatus, comprising:

an image forming device to form a mirror image on a transparent portion provided in at least a part of a first sheet; and a sheet cutter to cut an adhesion sheet, the sheet cutter including a pair of blades including a first blade having a blade edge and a second blade opposing the first blade and having a blade edge, the pair of blades configured to cut a border of the adhesion sheet;

a moving member to move the adhesion sheet in a direction perpendicular to blade surfaces of the first blade and the second blade;

a backward conveyance member to feed the adhesion sheet backward; and a controller to control the moving member and the backward conveyance member, wherein the adhesion sheet formed by adhering a first sheet, at least a part of which is transparent and bears a mirror image, to a non-transparent second sheet including an adhesive layer, to oppose the mirror image on the first sheet against the adhesive layer of the second sheet, and wherein, after the first blade and the second blade cut a first border of the adhesion sheet, the moving member moves the adhesion sheet in the direction perpendicular to the blade surfaces of the first blade and the second blade, and the backward conveyance member feeds the adhesion sheet backward, so that the first blade and the second blade cut a second border of the adhesion sheet opposing the first border.

19. A sheet cutter to cut an adhesion sheet, the sheet cutter comprising:

a pair of blades including a first blade having a blade edge and a second blade opposing the first blade and having a blade edge, the pair of blades configured to cut a border of the adhesion sheet;

a rotating member to rotate the adhesion sheet by about 90 degrees;

a backward conveyance member to feed the adhesion sheet backward; and a controller to control the rotating member and the backward conveyance member, wherein the adhesion sheet formed by adhering a first sheet, at least a part of which is transparent and bears a mirror image, to a non-transparent second sheet including an adhesive layer, to oppose the mirror image on the first sheet against the adhesive layer of the second sheet, and wherein, after the first blade and the second blade cut at least a first border of the adhesion sheet, the rotating member rotates the adhesion sheet by about 90 degrees, and the backward conveyance member feeds the adhesion sheet backward, so that the first blade and the second blade cut at least a second border of the adhesion sheet perpendicular to the first border.

* * * * *